(12) United States Patent
Yamazaki et al.

(10) Patent No.: US 11,417,000 B2
(45) Date of Patent: Aug. 16, 2022

(54) IMAGE PROCESSING SYSTEM, IMAGE PROCESSING METHOD, AND NON-TRANSITORY STORAGE MEDIUM

(71) Applicant: CANON KABUSHIKI KAISHA, Tokyo (JP)

(72) Inventors: Fukashi Yamazaki, Kanagawa (JP); Daisuke Furukawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 17/077,909

(22) Filed: Oct. 22, 2020

(65) Prior Publication Data
US 2021/0133977 A1 May 6, 2021

(30) Foreign Application Priority Data
Oct. 31, 2019 (JP) .............................. JP2019-199101

(51) Int. Cl.
*G06T 7/11* (2017.01)
*G06K 9/62* (2022.01)

(52) U.S. Cl.
CPC ................ *G06T 7/11* (2017.01); *G06K 9/628* (2013.01); *G06T 2207/10072* (2013.01); *G06T 2207/20081* (2013.01)

(58) Field of Classification Search
CPC ............. G06T 7/11; G06T 2207/10072; G06T 2207/20081; G06K 9/628; G06K 9/6256; G06K 9/6292; G06V 2201/031; G06V 10/82
See application file for complete search history.

(56) References Cited

U.S. PATENT DOCUMENTS

| | | | | |
|---|---|---|---|---|
| 7,680,307 | B2 * | 3/2010 | Sathyanarayana | ........ G06T 7/11 382/128 |
| 10,413,253 | B2 * | 9/2019 | Oh | ........................ A61B 5/7275 |
| 10,432,972 | B2 * | 10/2019 | Mukherjee | ............. H04N 19/82 |
| 10,452,957 | B2 * | 10/2019 | Kitamura | ............... G06V 10/82 |

(Continued)

OTHER PUBLICATIONS

Ronneberger et al. "U-Net: Convolutional Networks for Biomedical Image Segmentation", Computer Science Department and BIOSS Centre for Biological Signalling Studies, University of Freiburg, Germany, MICCAI, 2015.

*Primary Examiner* — Bobbak Safaipour
(74) *Attorney, Agent, or Firm* — Canon U.S.A., Inc. IP Division

(57) ABSTRACT

An image processing apparatus includes a first classification unit configured to classify each of a plurality of pixels included in a three-dimensional medical image using a first classifier for classifying each pixel into a plurality of classes including a class representing a first target region, a determination unit configured to determine an image region including the first target region and a second target region from the three-dimensional medical image based on a first classification result, a second classification unit configured to classify each of a plurality of pixels included in the determined image region using a second classifier for classifying each pixel into a plurality of classes including at least either one of a class representing the first target region and a class representing the second target region, and an integration unit configured to integrate the first and the second classification results to acquire a third classification result.

21 Claims, 10 Drawing Sheets

(56) References Cited

U.S. PATENT DOCUMENTS

| | | | |
|---|---|---|---|
| 10,607,135 B2* | 3/2020 | Zhang | G06K 9/6273 |
| 11,270,169 B2* | 3/2022 | Sun | G06T 5/007 |
| 2010/0177331 A1* | 7/2010 | Suzuki | H04N 1/58 |
| | | | 358/1.9 |
| 2013/0177068 A1* | 7/2013 | Minoo | H04N 19/117 |
| | | | 375/240.02 |
| 2015/0124866 A1* | 5/2015 | Fu | H04N 19/14 |
| | | | 375/240.02 |
| 2017/0278289 A1* | 9/2017 | Marino | G06T 11/60 |
| 2018/0247154 A1* | 8/2018 | Kitamura | G06V 30/194 |
| 2018/0289336 A1* | 10/2018 | Osawa | G06K 9/6273 |
| 2018/0293465 A1* | 10/2018 | Kanada | G06K 9/6267 |
| 2020/0320713 A1* | 10/2020 | Furukawa | G06T 7/194 |
| 2021/0012162 A1* | 1/2021 | Huang | G16H 30/40 |
| 2021/0064911 A1* | 3/2021 | Walach | G06V 10/751 |
| 2021/0134022 A1* | 5/2021 | Qin | G06V 40/168 |
| 2021/0166066 A1* | 6/2021 | Ando | G06T 3/40 |
| 2021/0166395 A1* | 6/2021 | Chen | G06T 7/0012 |
| 2021/0201476 A1* | 7/2021 | Prasad | G06T 7/20 |
| 2021/0295523 A1* | 9/2021 | Yamazaki | G06N 3/04 |
| 2022/0059221 A1* | 2/2022 | Zhu | G16H 50/20 |
| 2022/0076075 A1* | 3/2022 | Madani | G06N 3/0472 |

\* cited by examiner

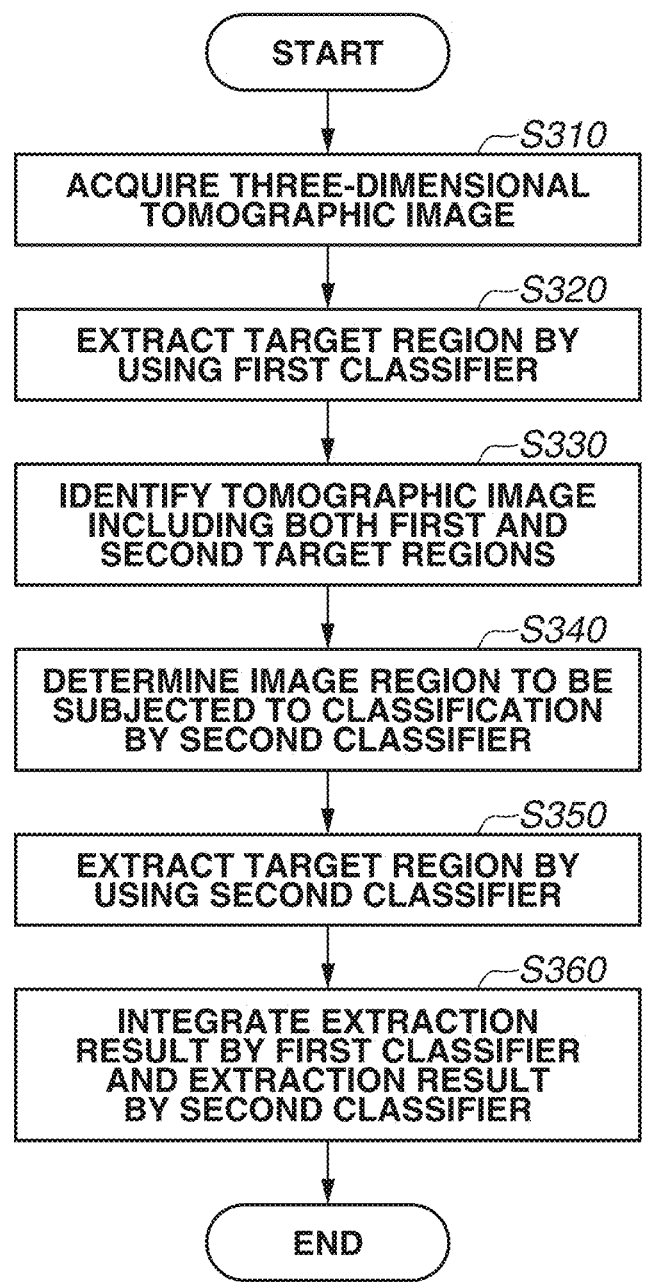

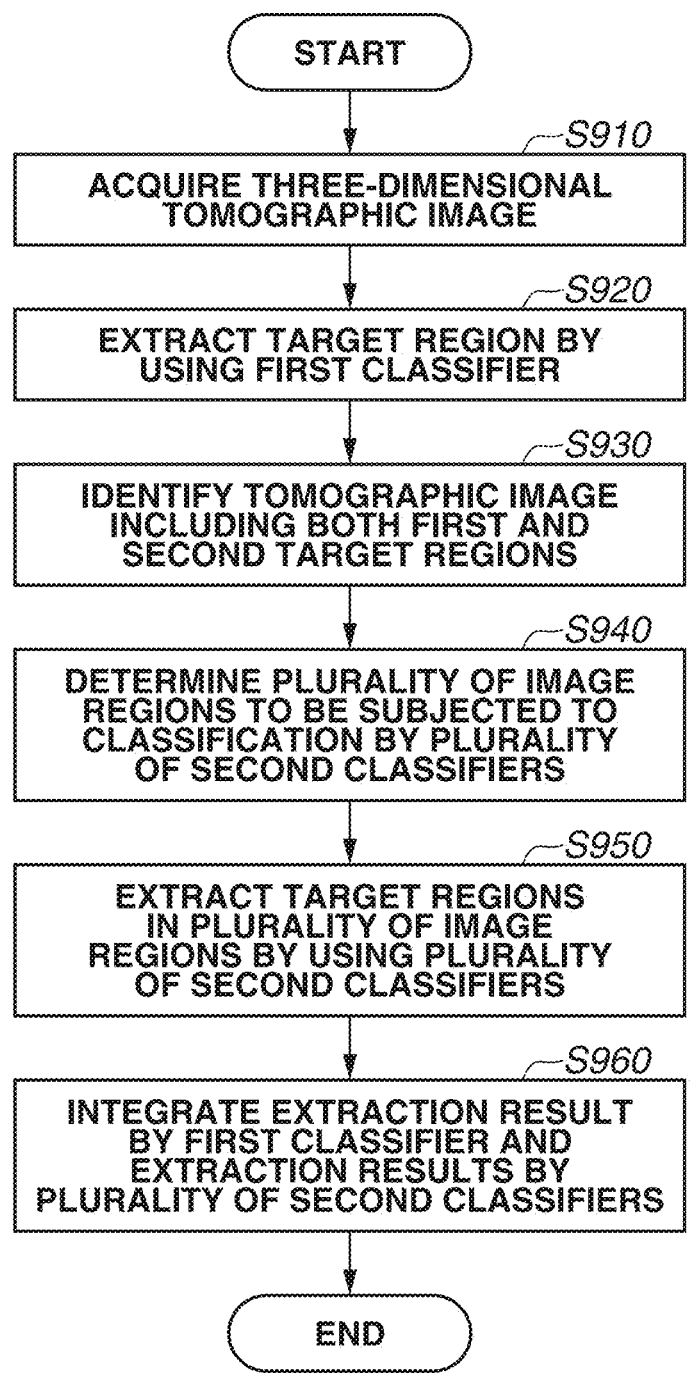

IMAGE PROCESSING SYSTEM, IMAGE PROCESSING METHOD, AND NON-TRANSITORY STORAGE MEDIUM

BACKGROUND

Field of the Disclosure

The present disclosure relates to an image processing apparatus for extracting a target region based on machine learning, an image processing method, and a non-transitory storage medium.

Description of the Related Art

Segmentation is one of image processing techniques. Segmentation refers to processing for distinguishing a target region in an image from regions other than the target region. Segmentation is also referred to as region extraction, region splitting, and image splitting. Among many segmentation techniques that have been proposed, techniques based on machine learning, such as the one disclosed in Olaf Ronneberger, et al. "U-Net: Convolutional Networks for Biomedical Image Segmentation", MICCAI, 2015, have attracted attention in recent years.

In a technique based on machine learning, a classifier is trained using a dataset called training data having a training image and a ground truth image. The training image refers to an image acquired by capturing an image of a target object in real space using an imaging apparatus, and therefore the training image includes the image of the target object. The image of the target object in the training image is referred to as a target region. A ground truth image refers to an image in association with the training image. The ground truth image includes a ground truth region. The ground truth region indicates at which position the target region is in the corresponding training image.

SUMMARY

Since an object captured together with a target object varies in images, each image includes some regions where extracting a target region using a single classifier trained based on machine-learning is likely to fail.

The present disclosure describes embodiments that provide an image processing apparatus in which accuracy of extracting a target region is improved even in a region where extraction of a target region is likely to fail.

According to an aspect of some embodiments, an image processing apparatus includes an acquisition unit configured to acquire a three-dimensional medical image, a first classification unit configured to classify each of a plurality of pixels included in the three-dimensional medical image acquired by the acquisition unit into a plurality of classes to acquire a first classification result, the classifying being performed using a first classifier trained based on machine-learning to classify each pixel into the plurality of classes including a class representing a first target region, a determination unit configured to determine an image region including at least the first target region and a second target region from the three-dimensional medical image as an image region to be subjected to classification, based on the first classification result, a second classification unit configured to classify each of a plurality of pixels included in the image region determined by the determination unit into a plurality of classes to acquire a second classification result, the classifying being performed using a second classifier trained based on machine-learning to classify each pixel into the plurality of classes including at least either one of a class representing the first target region and a class representing the second target region; and an integration unit configured to integrate the first and the second classification results to acquire a third classification result.

Further features of various embodiments will become apparent from the following description of exemplary embodiments with reference to the attached drawings.

BRIEF DESCRIPTION OF THE DRAWINGS

FIG. 3 is a flowchart illustrating an example of processing of the image processing apparatus according to the first exemplary embodiment.

FIG. 9 is a flowchart illustrating an example of processing of an image processing apparatus according to a third exemplary embodiment.

DESCRIPTION OF THE EMBODIMENTS

Figure 1:
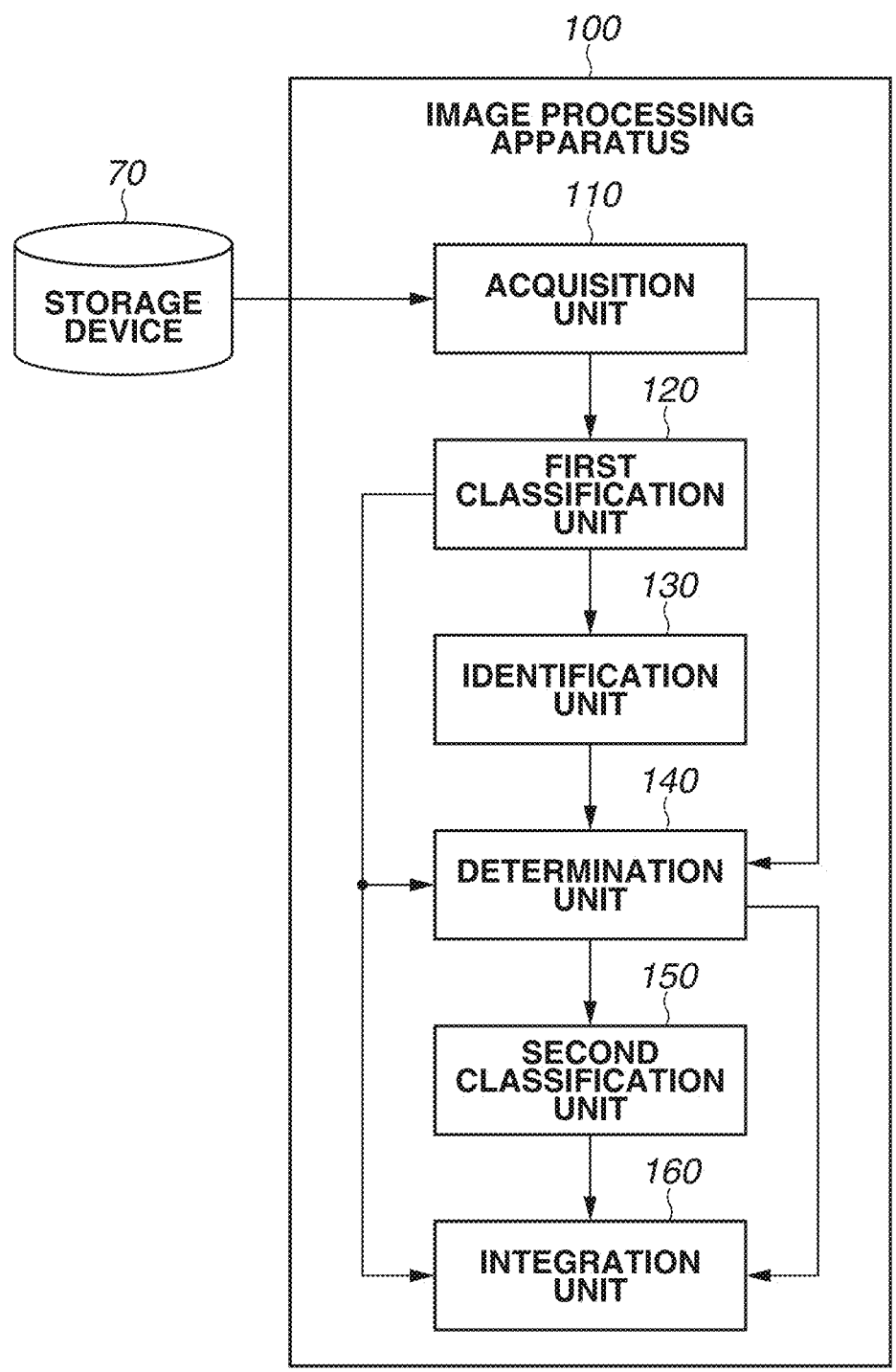
FIG. 1 is a diagram illustrating an example of a function configuration of an image processing apparatus according to a first exemplary embodiment.

Exemplary embodiments of the image processing apparatus disclosed in the present specification will be described below with reference to the accompanying drawings. Components, members, and processing identical or equivalent to each drawing are assigned the same reference numerals, and redundant descriptions thereof will be suitably omitted. In each drawing, components, members, and processing will be partially omitted. In the following descriptions, assigning a label or a quasi-label value (for example, likelihood) to each pixel included in an image is referred to as region extraction.

A description will be given of an example case in which a three-dimensional tomographic image captured by an X-ray computer tomographic image (X-ray computed tomography (CT)) apparatus is used as a segmentation target image, and a liver included in the three-dimensional tomographic image is used as a target object in segmentation.

The liver is adjacent to a plurality of organs in the human body. The plurality of organs adjacent to the liver includes organs having a similar density value to that of the liver in the three-dimensional tomographic image.

Therefore, when the region corresponding to the liver is extracted using a classifier trained based on machine-learning, the region extraction may fail in the vicinity of the boundary between the liver and an organ adjacent to the liver.

For example, the heart as an organ adjacent to the liver has a similar density value to that of the liver depending on imaging conditions. Although the diaphragm lies between the liver and the heart in reality, it is difficult to recognize the diaphragm in the three-dimensional tomographic image captured by the X-ray CT apparatus. For this reason, the liver and the heart are described as being adjacent to each other for the convenience of explanation. When the liver and the heart are adjacent, the classifier trained based on machine-learning may insufficiently extracts the hepatic region in the vicinity of the boundary between the liver and the heart or unsuccessfully extracts the cardiac region as the hepatic region.

Therefore, the extraction of the hepatic region in the three-dimensional tomographic image is one of desirable cases where the image processing apparatus disclosed in the present specification is applied. In the following description, an example of a three-dimensional medical image is used as a three-dimensional tomographic image, and the liver and heart in the three-dimensional tomographic image are used as examples of a first and a second target region, respectively (the second target region is adjacent to the first target region). More specifically, the first and the second target regions are adjacent to each other. Hereinafter, regions other than the target regions are represented as other regions.

The image processing apparatus disclosed in the present specification is applicable to all of the human body structures. This also applies to types of images. More specifically, the image processing apparatus disclosed in the present specification is also applicable to three-dimensional medical images captured by a Magnetic Resonance Imaging (MRI) apparatus, a Positron Emission Tomography (PET) apparatus, and a three-dimensional ultrasonic imaging apparatus.

A description of exemplary embodiments will be given of a case using a Convolutional Neural Network (CNN) as an example of a classifier trained based on machine-learning. In the following descriptions, assigning a predetermined label value or a quasi-label numerical value to each of a plurality of pixels included in an image is referred to as region extraction.

A target indicated in a ground truth image in training data to be used for training of the classifier is referred to as a class. For example, when a classifier is trained for classification between the liver and other organs, ground truth images corresponding to a class representing the liver and ground truth images corresponding to a class representing other organs are provided to the classifier to train the classifier. The trained classifier outputs a classification result, i.e., each of a plurality of pixels included in the input three-dimensional medical image is determined to be in either the class representing the liver or the class representing other organs. More specifically, when a three-dimensional medical image is input, the classifier generated by training using the training data classifies each of a plurality of pixels included in the three-dimensional medical image into any one of the trained classes.

According to a first exemplary embodiment, using a first classifier, the image processing apparatus first classifies each of the plurality of pixels included in the three-dimensional tomographic image as the liver (first target object), the heart (second target object adjacent to the first target object), or other organs. More specifically, the image processing apparatus extracts the hepatic and the cardiac regions from the three-dimensional tomographic image. Then, based on the extraction result by the first classifier, the image processing apparatus identifies axial tomographic images including both the liver and the heart. Axial tomographic images are two-dimensional tomographic images included in a three-dimensional tomographic image. Axial tomographic images are also referred to as slice images or axial cross-sectional images. Then, the image processing apparatus determines an image region to be subjected to the classification by the second classifier with reference to the identified axial tomographic images. Then, using the second classifier, the image processing apparatus extracts the hepatic region from the image region subjected to the classification. Lastly, the image processing apparatus integrates the hepatic region extracted by the first classifier with the hepatic region extracted by the second classifier and generates a result of the hepatic region extraction after the integration. As described above, the first and the second classifiers are CNNs for extracting a target region from an image. According to the present exemplary embodiment, the first classifier uses U-Net discussed in Olaf Ronneberger, et al., and the second classifier uses a network formed of the three-dimensionally expanded U-Net. For convenience, hereinafter, the former is referred to as a 2D-U-Net and the latter as a 3D-U-Net. More specifically, the first and the second classifiers in the image processing apparatus 100 are classifiers that have been trained based on deep learning.

The characteristics of the first and the second classifiers will be described below. The first classifier has been trained to extract the hepatic region from each axial tomographic images included in the three-dimensional tomographic image. In the region extraction by the first classifier, mis-classification may occur in pixels in the vicinity of the boundary between the liver and the heart. In the present exemplary embodiment, the first classifier has been trained to classify pixels into three different classes representing the hepatic region, the cardiac region, and regions other than the hepatic and the cardiac regions.

For example, the first classifier may misclassify pixels that belong to the liver as the heart (or regions other than the hepatic and the cardiac regions) (hereinafter referred to as insufficient extraction) or pixels that belong to the heart as the liver (hereinafter referred to as mis-extraction). Meanwhile, the second classifier has been trained to extract the hepatic region from a specific local range in the three-dimensional tomographic image. A local range refers to an image region including both the liver and the heart. More specifically, the second classifier is a classifier dedicated for an image including both the liver and the heart, and has higher classification accuracy for the liver and the heart in the image region than the first classifier.

As described above, the first and the second classifiers have different characteristics. Therefore, factoring the characteristics of the first and the second classifiers in, an integration unit 160 integrates the result of the hepatic region extraction by the first classifier and the result of the hepatic region extraction by the second classifier. More specifically, the result of the hepatic region extraction by the second classifier is used for the image region that is subjected to the classification by the second classifier, and the result of the hepatic region extraction by the first classifier is used for other image regions.

The present exemplary embodiment is implemented using the image processing apparatus 100 and an image processing apparatus 500. Alternatively, the image processing apparatus 100 may include the configuration of the image processing apparatus 500, and further alternatively, each of the image processing apparatuses may include different apparatuses.

When a three-dimensional medical image is input to the image processing apparatus 100, the image processing apparatus 100 applies the two discriminators, i.e., the first and the second classifiers, to the three-dimensional medical image to acquire a target region in the three-dimensional medical image. The image processing apparatus 500 trains the first and the second classifiers included in the image processing apparatus 100. In the following descriptions, the process for acquiring a target region by the image processing apparatus 100 is referred to as an inference process, and the process for training the first and the second classifiers by the image processing apparatus 500 is referred to as a training process. These processes in the two image processing apparatuses 100 and 500 may be implemented in the same single image processing apparatus or in different image processing apparatuses.

[Inference Process]

Firstly, configurations of the image processing apparatus 100 according to the present exemplary embodiment will be described below.

The function configuration of the image processing apparatus 100 according to the present exemplary embodiment will be described below with reference to FIG. 1. As illustrated in FIG. 1, the image processing apparatus 100 includes an acquisition unit 110 for acquiring a three-dimensional tomographic image and parameters for the classifiers, a first classification unit 120 for classifying the three-dimensional tomographic image, and an identification unit 130 for identifying axial tomographic images including the liver and heat regions. The image processing apparatus 100 further includes a determination unit 140 for determining the image region to be subjected to the classification by the second classifier, a second classification unit 150 for classifying the image region, and an integration unit 160 for integrating the classification result by the first classification unit 120 and the classification result by the second classification unit 150. The image processing apparatus 100 according to the present exemplary embodiment is provided with an external storage device 70.

The storage device 70 is an example of a computer-readable storage medium and is a mass-storage information storage device represented by a hard disk drive (HDD) and a solid-state drive (SSD). The storage device 70 includes at least one three-dimensional tomographic image, the parameter for the first classifier as the classifier of the first classification unit 120, and the parameter for the second classifier as the classifier of the second classification unit 150.

The acquisition unit 110 acquires a three-dimensional tomographic image to be subjected to the hepatic region extraction, the parameter for the first classifier of the first classification unit 120, the parameter for the second classifier of the second classification unit 150 from the storage device 70. The parameters for the classifiers are parameters generated by the training of the classifiers trained based on machine-learning. The generation of the parameters for the classifiers will be described below in the training process (described below). The acquisition unit 110 transmits the acquired three-dimensional tomographic image to the first classification unit 120 and the second classification unit 150. The acquisition unit 110 also transmits the parameter for the first classifier of the first classification unit 120 to the first classification unit 120, and transmits the parameter for the second classifier of the second classification unit 150 to the second classification unit 150.

Figure 4A:
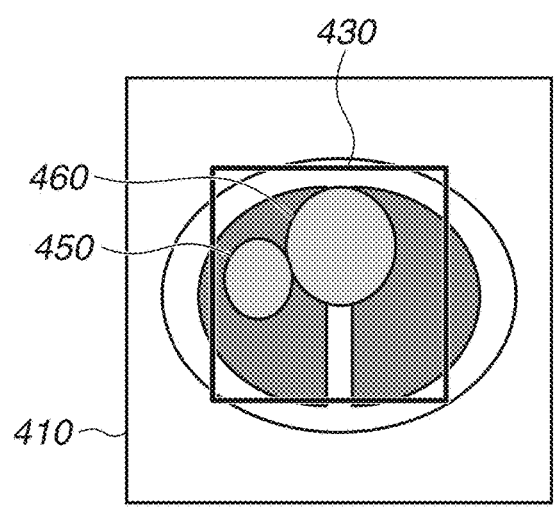
FIGS. 4A and 4B are diagrams illustrating examples of images according to the first exemplary embodiment.
Figure 4B:
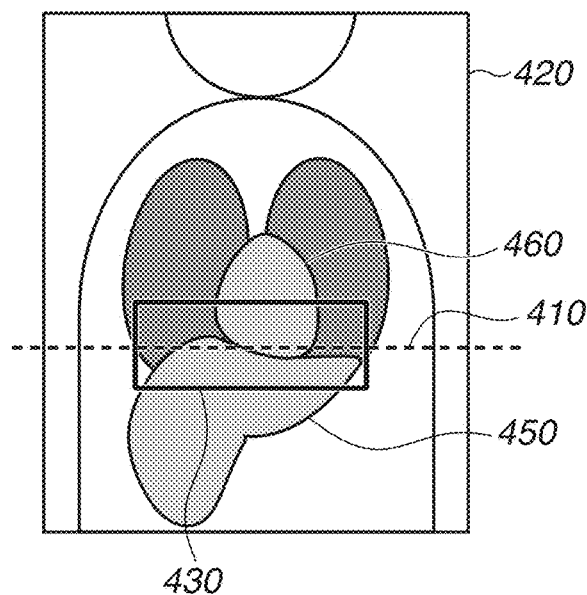

A three-dimensional tomographic image will be described below with reference to FIGS. 4A and 4B. FIGS. 4A and 4B illustrate two different tomographic images included in a three-dimensional tomographic image in the image processing apparatus 100 according to the first exemplary embodiment. FIG. 4A illustrates an axial tomographic image 410, and FIG. 4B illustrates a coronal tomographic image 420. A liver 450 and a heart 460 are drawn in the three-dimensional tomographic image.

The first classification unit 120 acquires the three-dimensional tomographic image and the parameter for the first classifier from the acquisition unit 110. The first classification unit 120 configures the first classifier based on the parameter for the first classifier acquired from the acquisition unit 110. Since the first classifier of the first classification unit 120 is the 2D-U-Net, the acquired parameter for the first classifier is the weight of the network. Using the 2D-U-Net, the image processing apparatus 100 acquires a first classification result as a result of extracting the target region corresponding to the three-dimensional tomographic image. Then, the first classification unit 120 transmits the first classification result by the first classification unit 120 to the identification unit 130, the determination unit 140, and the integration unit 160.

According to the present exemplary embodiment, the first classification result is a likelihood image representing the likelihood where each of a plurality of pixels belongs to the target region, with a pixel value from 0 to 1. For example, a pixel likely to be the target region is assigned a pixel value close to 1, and a pixel unlikely to be the target region is assigned a pixel value close to 0. The likelihood image has the same image size as the three-dimensional tomographic image.

The first classification result may be an image of any type as long as the image can represent the likelihood of being the target region. For example, the first classification result may be a binary mask image represented by binary pixel values indicating whether each pixel belongs to the target region, a multivalued mask image in which the label value associated with each target region is assigned to each pixel, or a recurrence image representing each target region with pixel values in different ranges. In a recurrence image, for example, the first target region is represented by pixel values from more than or equal to 1 to less than 2, the second target region is represented by pixel values from more than or equal to 2 to less than 3, and other regions are represented by pixel values from more than or equal to 0 to less than 1. The result of the target region extraction may have the same image size as the three-dimensional tomographic image as described above or may have different image sizes. More specifically, the first classifier of the first classification unit 120 is a classifier trained based on machine-learning to classify a plurality of classes including at least the class representing the first target region and the class representing the second target region.

According to the present exemplary embodiment, the 2D-U-Net of the first classification unit 120 inputs each of the axial tomographic images included in the three-dimensional tomographic image and classifies each of a plurality of pixels of the input axial tomographic images into classes representing the hepatic region, the cardiac region, and other regions. The 2D-U-Net of the first classification unit 120 generates two-dimensional likelihood images of the hepatic region and two-dimensional likelihood images of the cardiac region corresponding to the axial tomographic images. Then, the first classification unit 120 stacks the two-dimensional likelihood images of the target regions (the hepatic and the cardiac regions) corresponding to each of the axial tomographic images included in the three-dimensional tomographic image to generates a likelihood image of the target region corresponding to the three-dimensional tomographic image.

The identification unit 130 acquires the first classification result as a result of the target region extraction from the first classification unit 120. As described above, the first classification result includes a likelihood image representing the hepatic region and a likelihood image representing the cardiac region. The identification unit 130 identifies at least one axial tomographic image including both the liver and the heart from the three-dimensional tomographic image based on the likelihood image representing the hepatic region and the likelihood image representing the cardiac region. Then, the identification unit 130 transmits specific information as information about the identified axial tomographic images to the determination unit 140. According to the present exemplary embodiment, the specific information is slice indexes of the axial tomographic images in the three-dimensional tomographic image. Since the specific information may be any kind of information as long as the position of the tomographic image can be identified, the specific information may be the coordinate values of pixels included in the hepatic and the cardiac regions, for example. The determination unit 140 acquires the slice indexes as the specific information from the identification unit 130. Then, based on the slice indexes, the determination unit 140 determines the image region to be subjected to the classification which is performed by the second classification unit 150. Then, the determination unit 140 transmits information indicating the image region to be subjected to the classification to the second classification unit 150 and the integration unit 160. According to the present exemplary embodiment, the image region to be subjected to the classification is a bounding box including the boundary between the liver and the heart. The bounding box is represented by the coordinate values of a plurality of pixels.

The specific information transmitted from the identification unit 130 does not necessarily need to identify a tomographic image. For example, the image region to be subjected to the classification by the second classification unit 150 needs to be determined based on the relative position between the first and the second target regions (described below) and the classification result by the first classification unit 120. More specifically, the determination unit 140 determines the image region to be subjected to the classification based on the tomographic image including the first and the second target regions that are the image regions to be subjected to the classification by the second classification unit 150.

The second classification unit 150 receives the three-dimensional tomographic image and the parameter for the second classifier from the acquisition unit 110, and receives the image region to be subjected to the classification from the determination unit 140. Then, the second classification unit 150 configures the second classifier based on the parameter for the second classifier received from the acquisition unit 110. The second classifier of the second classification unit 150 is the 3D-U-Net. Therefore, the parameter for the second classifier is the weight of the network. Then, the second classification unit 150 acquires a second classification result as a result of the target region extraction using the 3D-U-Net for the image region to be subjected to the classification in the three-dimensional tomographic image. Then, the second classification unit 150 transmits the result of the target region extraction to the integration unit 160. The second classification result as a result of the target region extraction by the second classification unit 150 is an image having similar characteristics to the first classification result as a result of the target region extraction by the first classification unit 120 (described above). According to the present exemplary embodiment, the target region extracted by the second classification unit 150 is the hepatic region. More specifically, the second classification unit 150 generates a likelihood image representing the hepatic region as a target region and transmits the likelihood image to the integration unit 160. The likelihood image has the same image size as the image region to be subjected to the classification. The image size of the likelihood image may be the same as the image size of the image region as described above, the same as the image size of the three-dimensional tomographic image, or other image sizes.

More specifically, the first classifier of the first classification unit 120 and the second classifier of the second classification unit 150 output the likelihood image as a classification result.

The integration unit 160 integrates the likelihood image (first classification result) received from the first classification unit 120 and the likelihood image (second classification result) received from the second classification unit 150, based on information indicating the image region acquired from the determination unit 140. Then, the integration unit 160 generates a new likelihood image (third classification result). According to the present exemplary embodiment, the target object for the segmentation is the liver. Therefore, the integration unit 160 integrates the likelihood image of the hepatic region in the first classification result received from the first classification unit 120 and the likelihood image of the hepatic region in the second classification result received from second classification unit 150. Accordingly, the integration unit 160 generates a new likelihood image of the hepatic region as a third classification result. The integration unit 160 performs integration processing based on the likelihood. More specifically, the image processing apparatus 100 according to the present exemplary embodiment includes the acquisition unit 110 for acquiring a three-dimensional medical image, and the first classification unit 120 for classifying each of the plurality of pixels included in the three-dimensional medical image acquired by the acquisition unit 110 using a first classifier trained based on machine-learning to classify a plurality of classes including the class representing the first target region to acquire the first classification result. The image processing apparatus 100 also includes the determination unit 140 for determining image regions including at least the first and the second target regions as the image regions to be subjected to the classification based on the three-dimensional medical image. The image processing apparatus 100 further includes a second classification unit for classifying each of a plurality of pixels included in the image region determined by the determination unit 140 using a second classifier trained based on machine learning to classify a plurality of classes including at least either one of the class representing the first target region and the class representing the second target region to acquire the second classification result, and an integration unit for integrating the first and the second classification results to acquire the third classification result.

The image processing apparatus 100 further includes the identification unit 130 for identifying a tomographic image including at least the first and the second target regions from the three-dimensional medical image based on the first classification result. The determination unit 140 determines the image region to be subjected to the classification, based on the tomographic image identified by the identification unit 130.

Hereinafter, to simplify descriptions, a likelihood image acquired by the first classification unit 120 is referred to as a global likelihood image. A likelihood image acquired by the second classification unit 150 is referred to as a local likelihood image. Further, a likelihood image after the integration acquired by the integration unit 160 is referred to as an integrated likelihood image.

At least a part of the units of the image processing apparatus 100 illustrated in FIG. 1 may be implemented as an independent apparatus or software for implementing each function. According to the present exemplary embodiment, each unit of the image processing apparatus 100 is implemented by software.

(Hardware Configuration)

Figure 2:
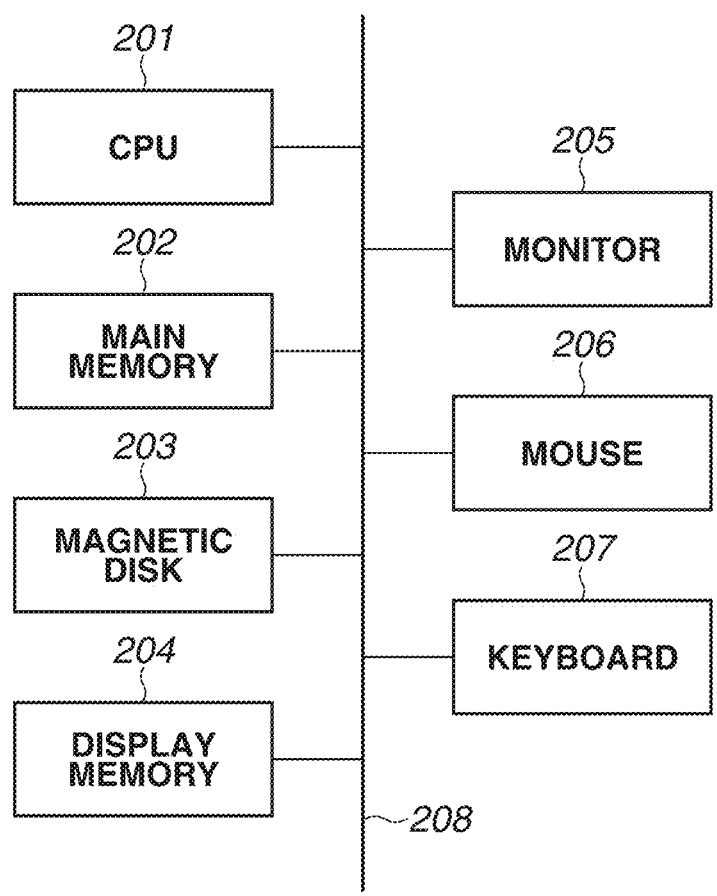
FIG. 2 is a diagram illustrating an example of a hardware configuration of the image processing apparatus according to the first exemplary embodiment.

FIG. 2 illustrates an example of a hardware configuration at the time of inference processing by the image processing apparatus 100. A Central Processing Unit (CPU) 201 mainly controls operations of each component. A main memory 202 stores control programs to be executed by the CPU 201 and offers a work area to be used when the CPU 201 executes a program. A magnetic disk 203 stores an operating system (OS), device drivers for peripheral devices, and programs for implementing various application software including programs for performing processing (described below). The functions (software) of the image processing apparatus 100 illustrated in FIG. 1 and processing in flowcharts (described below) are implemented when the CPU 201 executes the programs stored in the main memory 202 and the magnetic disk 203.

A display memory 204 temporarily stores display data. A monitor 205, such as a cathode ray tube (CRT) monitor and a liquid crystal display (LCD) monitor, displays images and texts based on the data from the display memory 204. A mouse 206 and a keyboard 207 accept pointing and text input operations by the user, respectively. The above-described components are connected with each other via a common bus 208 to communicate with each other.

The CPU 201 is equivalent to an example of a processor. The image processing apparatus 100 may include at least either one of a Graphics Processing Unit (GPU) and a Field Programmable Gate Array (FPGA) in addition to the CPU 201. The image processing apparatus 100 may also include at least either one of a GPU and a FPGA instead of the CPU 201. The main memory 202 and the magnetic disk 203 are equivalent to examples of memories.

(Processing Procedure)

Processing procedure of the image processing apparatus 100 according to the present exemplary embodiment will be described below with reference to the flowchart illustrated in FIG. 3.

(S310)

In S310, the acquisition unit 110 acquires a three-dimensional tomographic image, the parameter for the first classifier, and the parameter for the second classifier from the storage device 70. Then, the acquisition unit 110 transmits the acquired three-dimensional tomographic image to the first classification unit 120 and the second classification unit 150. The acquisition unit 110 also transmits the parameter for the first classifier to the first classification unit 120 and transmits the parameter for the second classifier to the second classification unit 150.

(S320)

In S320, the first classification unit 120 acquires the three-dimensional tomographic image and the weight of the 2D-U-Net network as the parameter for the first classifier from the acquisition unit 110. Then, the first classification unit 120 configures the 2D-U-Net as the first classifier based on the acquired weight of the network. The first classification unit 120 uses the 2D-U-Net to extract the hepatic and the cardiac regions from the three-dimensional tomographic image, and generates a global likelihood image of the hepatic region and a global likelihood image of the cardiac region as the first classification result. Then, the first classification unit 120 transmits the global likelihood images to the identification unit 130, the determination unit 140, and the integration unit 160.

The 2D-U-Net according to the present exemplary embodiment is configured by connections of three different layers: an input layer for receiving an input, a plurality of intermediate layers, such as the Convolution layer and the Pooling layer for extracting features from the input, and an output layer for classifying regions for each pixel based on the extracted features. The weight of the 2D-U-Net network received from the acquisition unit 110 stores the filter value in the Convolution layer. By the configuration of the 2D-U-Net using the filter value, the image processing apparatus can extract features from the input and acquiring a desired output. In this case, the 2D-U-Net inputs two-dimensional images. Therefore, in S320, the first classification unit 120 inputs the axial tomographic images included in the three-dimensional tomographic image one by one to the 2D-U-Net. The axial tomographic image 410 illustrated in FIG. 4A indicates an example of an input to the 2D-U-Net. Then, the first classification unit 120 extracts features of the axial tomographic images input from the plurality of intermediate layers and generates a feature map. The first classification unit 120 applies the Softmax function to the feature map to classify each of a plurality of pixels in the axial tomographic image 410 into the hepatic class, the cardiac class, and other organs' class, and acquires the results of the hepatic region extraction and the cardiac region extraction. More specifically, the first classification unit 120 acquires a two-dimensional likelihood image for the class of the liver 450 in the axial tomographic image 410 and a two-dimensional likelihood image for the class of the heart 460 by the 2D-U-Net of the first classification unit 120. The 2D-U-Net of the first classification unit 120 performs the above-described processing on each of the axial tomographic images included in the three-dimensional tomographic image. The first classification unit 120 stacks the two-dimensional likelihood images corresponding to all of the axial tomographic images to generate a global likelihood image corresponding to the three-dimensional tomographic image.

Figure 8A:
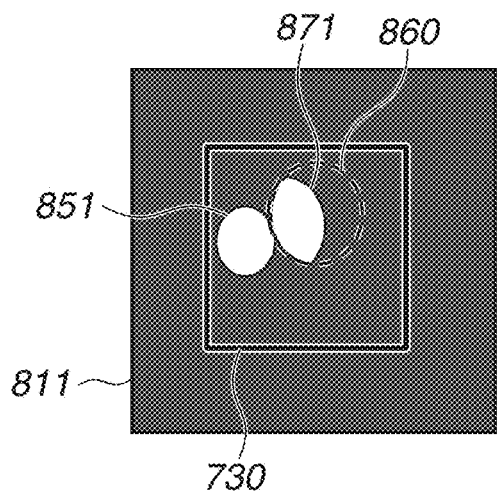
FIGS. 8A, 8B, 8C, 8D, 8E, and 8F are diagrams illustrating examples of outputs of the image processing apparatus according to the first exemplary embodiment.
Figure 8B:
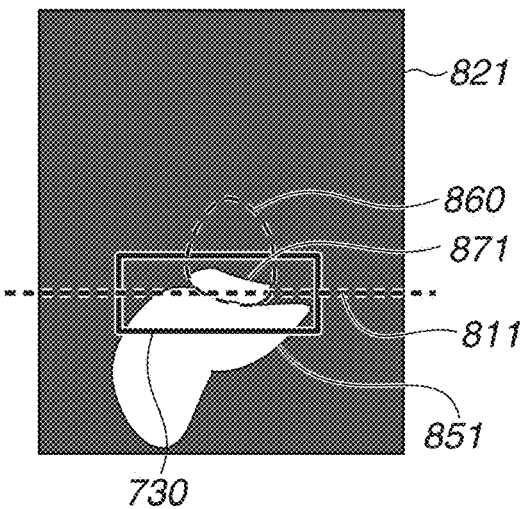

The result of the hepatic region extraction as a target region by the first classification unit 120 will be described below with reference to FIGS. 8A to 8F. FIG. 8A illustrates an example of an axial cross-section of the global likelihood image of the hepatic region (a global axial likelihood image 811 of the hepatic region) generated by the first classification unit 120, and is a likelihood image of the hepatic region corresponding to the axial tomographic image 410 illustrated in FIG. 4A. Likewise, FIG. 8B illustrates an example of a coronal cross-section of the global likelihood image of the hepatic region (a global coronal likelihood image 821 of the hepatic region) generated by the first classification unit 120, and is a likelihood image of the hepatic region corresponding to the coronal tomographic image 420 illustrated in FIG. 4B. FIG. 8B illustrates a portion of the hepatic region with a high likelihood in a light color, and a portion of the hepatic region with a low likelihood in a deep color. Referring to FIG. 8B, the dotted line 860 indicates the boundary of the true cardiac region. In this case, attention must be paid to a region 871 where mis-extraction (misclassification) is performed on the heart. As described above, the first classification unit 120 is likely to misclassify pixels in the vicinity of the boundary between the liver and the heart. FIG. 8B illustrates this phenomenon, and the first classification unit 120 misclassifies pixels belonging to the heart as the liver. In this way, while the first classification unit 120 is characterized in extracting the hepatic region from each of the axial tomographic images included in the three-dimensional tomographic image, accuracy of extracting the hepatic region in the axial tomographic images is insufficient in the vicinity of the boundary between the liver and the heart.

While, in the present exemplary embodiment, the classifier of the first classification unit 120 (first classifier) is the 2D-U-Net, any types of classifiers trained based on machine-learning are applicable as the first classifier. Classifiers trained based on machine-learning include, for example, a CNN other than the above-described U-Net, other deep learning techniques, Support Vector Machine, and AdaBoost.

When the first classifier is Support Vector Machine, for example, the parameter for the classifier is the value of the weight vector of an identification function. When the Kernel trick is used, the parameter for the classifier is the Kernel function. When the first classifier is AdaBoost, the parameter for the classifier includes a weak discriminator selected by a training algorithm, the parameter for the weak discriminator, and the weight applied to the weak discriminator. When using these classifiers, the first classification unit 120 extracts features from the three-dimensional tomographic image by a known method and inputs the extracted features to the classifiers to extract a target region.

When the classifier is a CNN, the parameter for the classifier is the weight of the network. A CNN for maintaining and outputting the shape of the image (a network belonging to Fully Convolutional Network), like U-Net, may perform similar processing to the above-described 2D-U-Net. Like Support Vector Machine, a CNN that does not maintain the image shape with a fully connected layer or Global Average Pooling layer extracts features from the three-dimensional tomographic image by a known method, and inputs the extracted features to the CNN to extract a target region.

The image to be input to the first classification unit 120 may be subjected to arbitrary preprocessing, such as the image size and resolution changes and the density value normalization. Using a classifier trained based on machine-learning, it is easier to acquire an extraction result with high accuracy by subjecting the input image to similar preprocessing to that performed at the time of the training. Therefore, for example, in a case where the density value has been normalized to achieve an average of 0 and a variance of 1, the image to be input to the first classification unit 120 is subjected to similar density value normalization before being input to the first classification unit 120. In a case where a classifier has been trained with [w, h]=[256, 256] where w denotes the width and h denotes the height of the image, the image to be input to the first classification unit 120 is changed to the similar image size before being input to the first classification unit 120.

As described above, using the 2D-U-Net, the first classification unit 120 generates a global likelihood image of the hepatic region and a global likelihood image of the cardiac region corresponding to the three-dimensional tomographic image as the first classification result.

(S330)

In S330, the identification unit 130 receives the global likelihood image of the hepatic region and the global likelihood image of the cardiac region corresponding to the three-dimensional tomographic image as the first classification result from the first classification unit 120. Then, based on the global likelihood image of the hepatic region and the global likelihood image of the cardiac region, the identification unit 130 identifies axial tomographic images including both the hepatic and the cardiac regions to identify axial tomographic images likely including both the liver and the heart. Then, the identification unit 130 transmits the slice indexes of the identified axial tomographic images to the determination unit 140 as the specific information.

The process for identifying axial tomographic images including both the liver and the heart in S330 will be described below.

Firstly, the identification unit 130 subjects the global likelihood images of the hepatic and the cardiac regions to threshold value processing using a threshold value t to generate a temporary hepatic region mask and a temporary cardiac region mask. For example, using the threshold value t=0.5, the identification unit 130 generates temporary region mask images representing respective target regions by setting the pixels of the target region having a high likelihood to 1 and setting the pixels of the target region having a low likelihood to 0. Temporary region masks may possibly include an isolated noise region. This may reduce the identification accuracy for axial tomographic images including both the hepatic and the cardiac regions. In this case, since the hepatic and the cardiac regions as target objects can be extracted as the maximal region components in the temporary region masks, the identification unit 130 deletes the isolated noise regions by acquiring the maximum connected region components in the temporary region masks.

For the acquired temporary hepatic region mask and the acquired temporary cardiac region mask, the identification unit 130 scans the slices of each temporary region mask in the axial direction to identify the indexes of one or more slices including both the hepatic and the cardiac regions. According to the present exemplary embodiment, a set of all of the slice indexes including both the hepatic and the cardiac regions is recognized as the specific information. Hereinafter, a range indicated by a set of slice indexes is referred to as a specific range. As described above, based on the results of the hepatic region (first target region) extraction and the cardiac region (second target region) extraction acquired from the first classification unit 120, the identification unit 130 identifies axial tomographic images including both the two target regions at the same time.

(S340)

In S340, the determination unit 140 receives a global likelihood image from the first classification unit 120, and receives a set of slice indexes of axial tomographic images as the specific information from the identification unit 130. Then, based on the received set of slice indexes, the determination unit 140 determines a bounding box representing the image region to be subjected to the classification by the second classification unit 150. Then, the determination unit 140 transmits the bounding box to the second classification unit 150.

According to the present exemplary embodiment, the set of slice indexes is the slice indexes of all of the axial tomographic images determined by the identification unit 130 that both the hepatic and the cardiac regions are included. The determination unit 140 determines the image region to be subjected to the classification by the second classification unit 150 from the specific range in the three-dimensional tomographic images represented by a set of slice indexes. Firstly, the determination unit 140 determines the smallest bounding box enclosing the hepatic and the cardiac regions, to target the inside of the specific ranges in the global likelihood images of the hepatic and the cardiac regions. The bounding box is represented by a plurality of coordinate values. For example, the bounding box has the coordinate values of two diagonal vertexes of a rectangular parallelepiped defining the bounding box, such as [(x_0, y_0, z_0), (x_1, y_1, z_1)]. Further, the result of the target region extraction (first classification result) by the first classification unit 120 may possibly indicate insufficient extraction of the hepatic or the cardiac region. Therefore, the determination unit 140 determines a bounding box having additional predetermined margins from the smallest bounding box enclosing the hepatic and the cardiac regions. For example, the determination unit 140 applies pixels for 10 mm in the physical space as a margin to x_0, x_1, y_0, y_1, and then applies pixels for 15 mm in the physical space as a margin to z_0, z_1. In this way, the determination unit 140 applies a predetermined value as a margin to each coordinate value. Referring to FIGS. 8A to 8F, a bounding box 730 is an example of an image region to be subjected to the classification by the second classification unit 150, determined by the determination unit 140.

More specifically, the determination unit 140 determines the bounding box including at least the first and the second target regions for the tomographic image identified by the identification unit 130, and determines the image region to be subjected to the classification based on the determined bounding box. As described above, the determination unit 140 determines the bounding box indicating the image region to be subjected to the classification by the second classification unit 150.

(S350)

In S350, the second classification unit 150 receives the three-dimensional tomographic image and the parameter for the second classifier from the acquisition unit 110. Then, the second classification unit 150 configures the second classifier based on the received parameter. The second classification unit 150 also receives the bounding box representing the image region to be subjected to the classification by the second classification unit 150 from the determination unit 140. Then, using second classifier, the second classification unit 150 extracts the hepatic region as a target region from the image region to be subjected to the classification by the second classification unit 150 in the three-dimensional tomographic image, and generates a local likelihood image of the hepatic region as the second classification result. The second classification unit 150 transmits the local likelihood image of the hepatic region generated by the second classification unit 150 to the integration unit 160.

According to the present exemplary embodiment, the second classifier that is used by the second classification unit 150 is the 3D-U-Net. The 3D-U-Net has a similar configuration to that of the above-described 2D-U-Net. The 3D-U-Net differs from the 2D-U-Net in that the input layer receives a three-dimensional image and that a part or whole of processing of the intermediate layers for extracting features from the input performs feature extraction by three-dimensional processing. The 3D-U-Net further differs from the 2D-U-Net in that the output of the output layer is a three-dimensional likelihood image corresponding to the input three-dimensional image.

According to the present exemplary embodiment, the image region received from the determination unit 140 is a plurality of coordinate values for representing a bounding box. Therefore, the image region specified by the bounding box is clipped from the three-dimensional tomographic image to generate a partial three-dimensional tomographic image in such a manner that the generated image matches to the image size of the image to be input to the second classification unit 150, and changes the image size of the partial three-dimensional tomographic image. To change the image size, known image interpolation methods, such as bi-linear interpolation and nearest neighbor interpolation, are applicable. The partial three-dimensional tomographic image, acquired after the image size change, acquired in the above described way is input to the 3D-U-Net. Then, features to the partial three-dimensional tomographic image acquired after the image size change as an input by the plurality of intermediate layers are extracted and a feature map is generated. Then, the Sigmoid function is applied to the feature map via the output layer to normalize each pixel of the feature map to 0 to 1, whereby a result of the hepatic region extraction is acquired. More specifically, a partial three-dimensional likelihood image of the hepatic region in the partial three-dimensional tomographic image acquired after the image size change is acquired. The partial three-dimensional likelihood image of the hepatic region acquired in the above described way is a spatial likelihood image different from the three-dimensional tomographic image. Therefore, postprocessing is performed to obtain the same space as that of the three-dimensional tomographic image. More specifically, the image size of the partial three-dimensional likelihood image is changed to obtain the same image size as that of the partial three-dimensional tomographic image acquired before the image size change. Then, padding is performed on pixels outside the partial three-dimensional likelihood image to obtain the same image size as that of the three-dimensional tomographic image, to generate a local likelihood image of the hepatic region. The pixel value of pixels to be padded is, for example, 0.

Figure 8C:
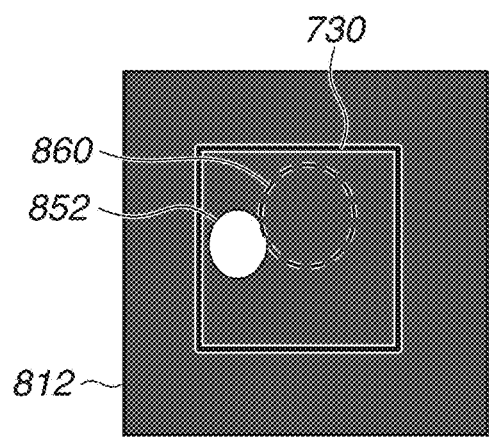
Figure 8D:
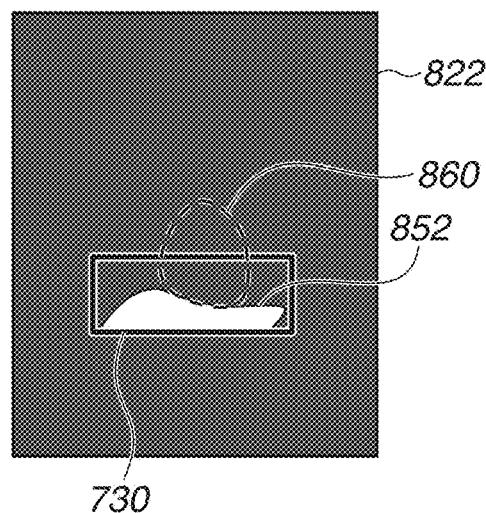

The result of the hepatic region extraction by the second classification unit 150 will be described below with reference to FIGS. 8A to 8F. FIG. 8C illustrates an example of an axial cross-section of the local likelihood image of the hepatic region (a local axial likelihood image 812 of the hepatic region) generated by the second classification unit 150. This likelihood image of the hepatic region corresponds to the axial tomographic image 410 illustrated in FIG. 4A. Likewise, FIG. 8D illustrates an example of a coronal cross-section of the local likelihood image of the hepatic region (a local coronal likelihood image 822 of the hepatic region) generated by the second classification unit 150. This likelihood image of the hepatic region corresponds to the coronal tomographic image 420 illustrated in FIG. 4B. As illustrated in FIG. 8D, the second classification unit 150 enables acquiring an extraction result only for the inside of the image region indicated by the bounding box 730. In comparison with the results of the extraction by the first classification unit 120 illustrated in FIGS. 8A and 8B, the extraction result by the second classification unit 150 demonstrates that the amount of mis-extraction to the true cardiac region (the dotted line 860) like the region 871 is small (mis-extraction does not occur in the example illustrated in FIG. 8D). As described above, the second classification unit 150 is characterized in the tendency of higher accuracy in the hepatic region extraction than the first classification unit 120 in the image region indicated by the bounding box 730.

While, in the present exemplary embodiment, the classifier (second classifier) of the second classification unit 150 is the 3D-U-Net, any classifier trained based on machine-learning is applicable, like the first classification unit 120. Like the first classification unit 120, the image to be input to the second classification unit 150 may be subjected to arbitrary preprocessing, such as the image size change and the density value normalization.

As described above, using the 3D-U-Net, the second classification unit 150 generates a local likelihood image of the hepatic region as the second classification result from the image region subjected to the classification by the second classification unit 150.

(S360)

In S360, the integration unit 160 receives the global likelihood image as the first classification result from the first classification unit 120, receives the local likelihood image as the second classification result from the second classification unit 150, and receives the image region to be subjected to the classification by the second classification unit 150 from the determination unit 140. Then, based on the image region to be subjected to the classification by the second classification unit 150 acquired from the determination unit 140, the integration unit 160 integrates the global and the local likelihood images to generate an integrated likelihood image as the third classification result. Since the image processing apparatus according to the present exemplary embodiment is for the liver as the target object, the integrated likelihood image is a result of the hepatic region extraction. Then, the integration unit 160 outputs the generated integrated likelihood image to the storage device 70.

According to the present exemplary embodiment, the integration unit 160 receives the global likelihood images of the hepatic and the cardiac regions from the first classification unit 120, and receives the local likelihood image of the hepatic region from the second classification unit 150. The integration unit 160 integrates these likelihood images to generate an integrated likelihood image of the hepatic region. As described above, the global likelihood image of the hepatic region from the first classification unit 120 has low extraction accuracy in the region in the vicinity of the boundary between the liver and the heart. More specifically, the image region to be subjected to the classification by the second classification unit 150 has low extraction accuracy. Therefore, for the pixels included in the image region, the integration unit 160 uses the pixel value (likelihood) of the local likelihood image of the hepatic region from the second classification unit 150. For pixels outside the image region subjected to the classification by the second classification unit 150, the integration unit 160 integrates the two likelihood images using the pixel values of the global likelihood image of the hepatic region. More specifically, the integration unit 160 performs integration using the second classification result for the pixels included in the image region in the three-dimensional medical image, and using the first classification result for regions not included in the image region in the three-dimensional medical image, to acquire the third classification result.

When $p_{global}^{liver}(i)$ denotes the pixel values of the global likelihood image of the hepatic region, $p_{local}^{liver}(i)$ denotes the pixel values of the local likelihood image of the hepatic region, and $p_{merge}^{liver}(i)$ denotes the pixel values of the likelihood image of the hepatic region after the integration, the above-described integration method is represented by the following formula (1):

$$p_{merge}^{liver}(i) = \begin{cases} p_{local}^{liver}(i) & i \in \Omega_{local} \\ p_{global}^{liver}(i) & \text{otherwise} \end{cases} \qquad (1)$$

where $\Omega_{local}$ denotes the image region to be subjected to the classification by the second classification unit 150.

As described above, the integration unit 160 integrates the global likelihood image as the first classification result generated by the first classification unit 120 and the local likelihood image as the second classification result generated by the second classification unit 150 to generate a likelihood image of the hepatic region acquired after the integration as the third classification result.

Figure 8E:
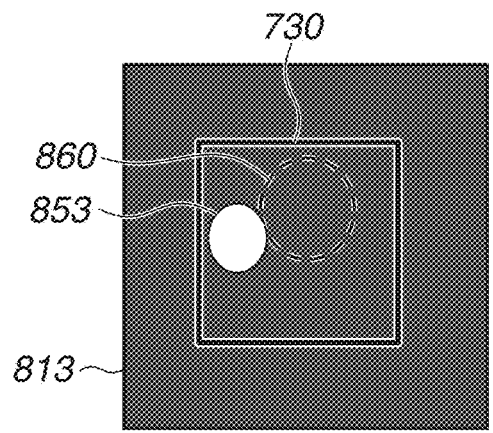
Figure 8F:
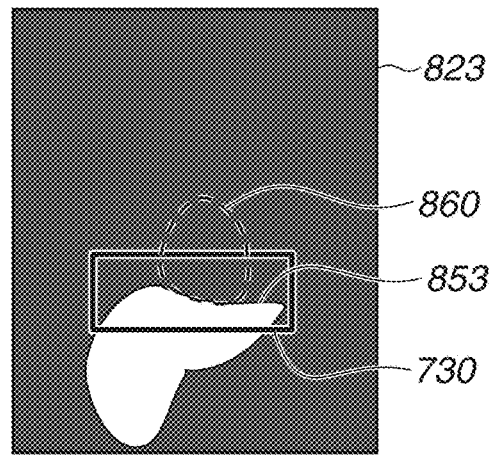

The result of the hepatic region extraction acquired by the integration unit 160 will be described below with reference to FIGS. 8A, to 8F. FIG. 8E illustrates an example of an axial cross-section of the integrated likelihood image of the hepatic region (an integrated likelihood image 813 of the axial cross-section of the hepatic region) generated by the integration unit 160. This likelihood image of the hepatic region corresponds to the axial tomographic image 410 illustrated in FIG. 4A. Likewise, FIG. 8F illustrates an example of a coronal cross-section of the integrated likelihood image of the hepatic region (an integrated likelihood image 823 of the coronal cross-section of the hepatic region) generated by the integration unit 160. This likelihood image of the hepatic region corresponds to the coronal tomographic image 420 illustrated in FIG. 4B. Referring to the integrated likelihood image of the hepatic region illustrated in FIG. 8F, the entire hepatic region is extracted like the global likelihood images of the hepatic region illustrated in FIGS. 8A and 8B. However, since the pixel values of the local likelihood images of the hepatic region illustrated in FIGS. 8C and 8D are reflected in the bounding box 730, the amount of mis-extraction to the true cardiac region (the dotted line 860) like the region 871 is small (mis-extraction does not occur in the example illustrated in FIG. 8F).

According to the above-described processing procedures, the image processing apparatus 100 according to the first exemplary embodiment extracts the hepatic region from the three-dimensional tomographic image.

[Training Process]

The configuration of the image processing apparatus 500 according to the present exemplary embodiment will be described below.

Figure 5:
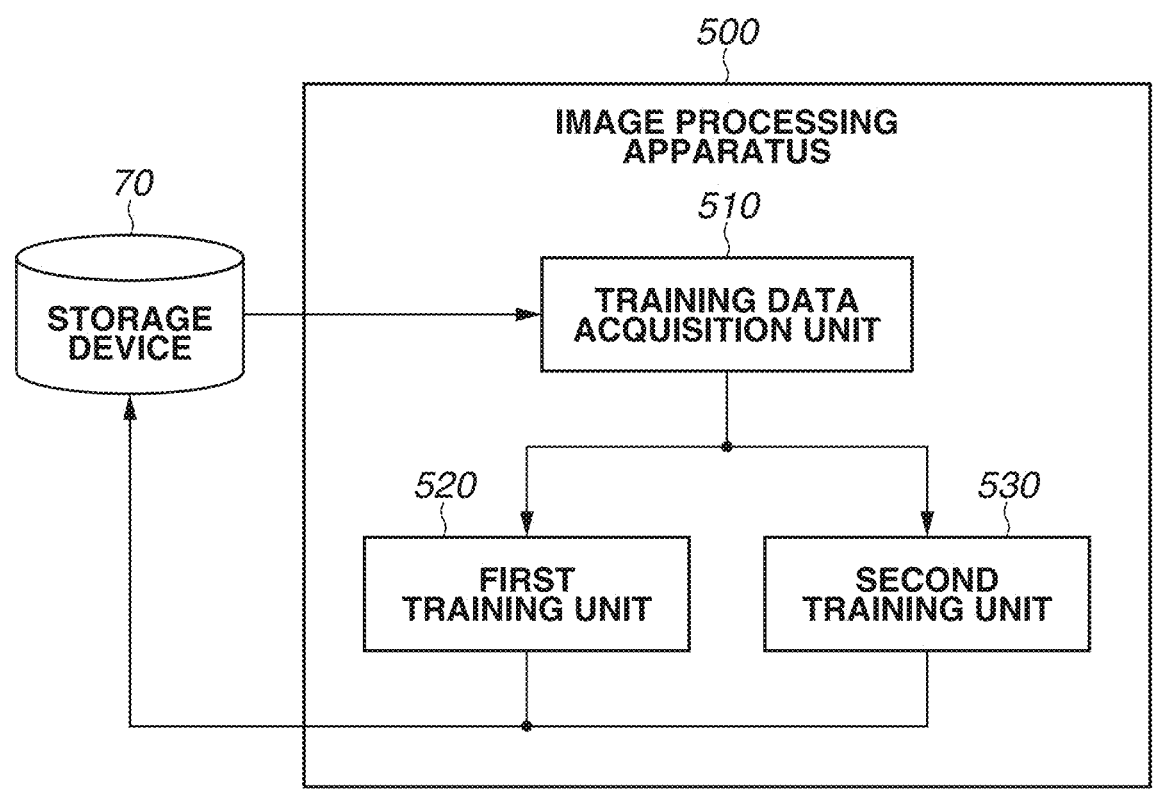
FIG. 5 is a diagram illustrating an example of a function configuration related to training in the image processing apparatus according to the first exemplary embodiment.

The function configuration of the image processing apparatus 500 according to the present exemplary embodiment will be described below with reference to FIG. 5. As illustrated in FIG. 5, the image processing apparatus 500 includes a training data acquisition unit 510, a first training unit 520, and a second training unit 530. The image processing system for training the classifier according to the present exemplary embodiment is provided with the storage device 70 outside the image processing apparatus 500.

Figure 7A:
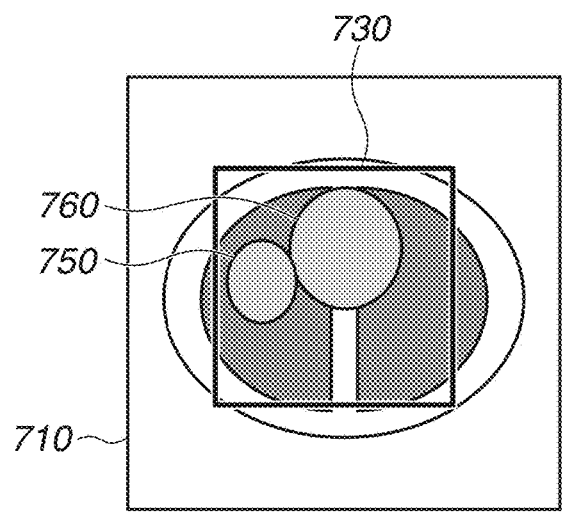
FIGS. 7A, 7B, 7C, and 7D are diagrams illustrating examples of training data according to the first exemplary embodiment.
Figure 7B:
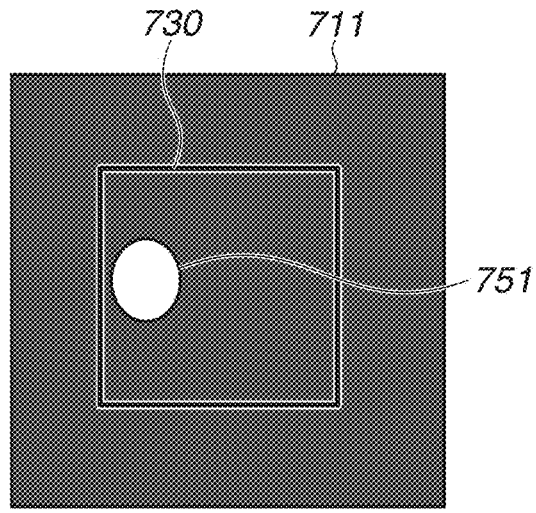
Figure 7C:
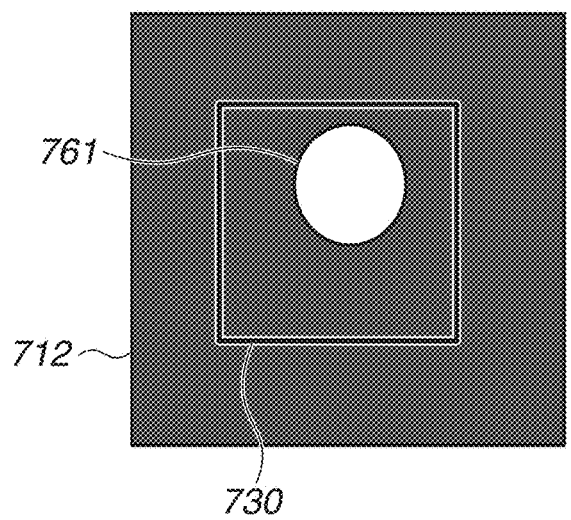
Figure 7D:
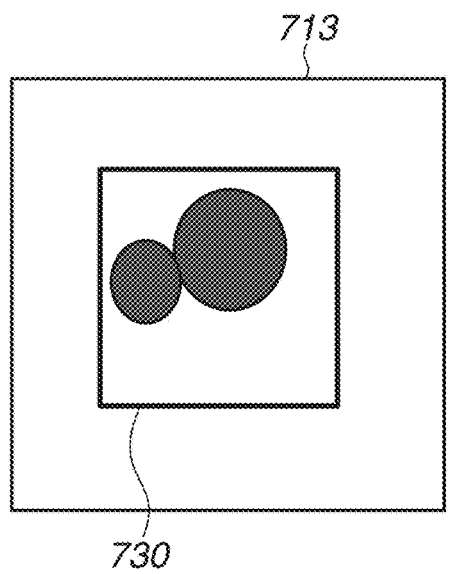

The training data acquisition unit 510 acquires one or more pieces of training data from the storage device 70. Then, the training data acquisition unit 510 transmits the acquired training data to the first training unit 520 and the second training unit 530. The one or more pieces of the training data acquired from the storage device 70 by the training data acquisition unit 510 is referred to as the master of a training dataset. According to the present exemplary embodiment, the training image included in the training data is a three-dimensional tomographic image as a three-dimensional medical image for use in training, and the ground truth image is a mask image representing the target region corresponding to the three-dimensional tomographic image. The training data will be described below with reference to FIGS. 7A, 7B, 7C, and 7D. FIG. 7A illustrates one section (an axial tomographic image 710) included in the three-dimensional medical image (three-dimensional tomographic image) for training. FIGS. 7B, 7C, and 7D illustrate a two-dimensional ground truth image 711 for the hepatic region, a two-dimensional ground truth image 712 for the cardiac region, and a two-dimensional ground truth image 713 for other regions, respectively, corresponding to the axial tomographic image 710 in the three-dimensional medical image for use in training. The two-dimensional ground truth image 711 of the hepatic region includes a hepatic region 751 corresponding to a liver 750 in the axial tomographic image 710. Likewise, the two-dimensional ground truth image 712 of the cardiac region includes a cardiac region 761 corresponding to a heart 760. These two-dimensional ground truth images 711 and 712 are binary images, and there is no duplicated region between the two-dimensional ground truth images 711 and 712. More specifically, when the pixel value of a certain pixel in the two-dimensional ground truth image 711 of the hepatic region is 1, each pixel value of the corresponding pixel in the two-dimensional ground truth image 712 for the cardiac region and the two-dimensional ground truth image 713 for other regions becomes 0. Because of the above-described characteristics, other regions can be represented as all regions other than the hepatic and the cardiac regions. Therefore, other regions do not need to be acquired by the training data acquisition unit 510. The first training unit 520 receives the master of the training dataset from the training data acquisition unit 510. Then, a first training range is set for the training data included in the master of the training dataset and each piece of the training data is preprocessed according to the first training range to generate a first training dataset. Then, the first training unit 520 trains the first classifier using the first training dataset, and records the parameter for the first classifier acquired by the training in the storage device 70. More specifically, the first classifier of the first classification unit 120 includes a classifier trained using the first training dataset obtained based on the three-dimensional medical image for use in training.

The first training range is the image region to be subjected to the training of the first classifier in the three-dimensional medical image for use in training included in the training data. According to the present exemplary embodiment, axial tomographic images including at least either one of the hepatic and the cardiac regions among the axial tomographic images included in the three-dimensional medical image for use in training is set as the first training range. The first classifier that is trained by the first training unit 520 in the image processing apparatus 500 has the same configuration as that of the first classifier of the first classification unit 120 in the image processing apparatus 100. More specifically, the classifier that is trained by the first training unit 520 is the 2D-U-Net. The first training unit 520 trains the 2D-U-Net to acquire the weight of the 2D-U-Net network as the parameter for the first classifier.

The second training unit 530 receives the master of the training dataset from the training data acquisition unit 510. Then, the second training unit 530 sets the second training range in the training data included in the master of the training dataset and preprocesses each piece of the training data according to the second training range to generate a second training dataset. Then, the second training unit 530 trains the second classifier using the second training dataset and records the parameter for the second classifier acquired by the training in the storage device 70. More specifically, the second classifier of the second classification unit 150 includes a classifier trained using the second training dataset based on the three-dimensional medical image for use in training. Like the first training range, the second training range is an image region subjected to the training of the second classifier in the three-dimensional medical image for use in training included in the training data. According to the present exemplary embodiment, the local image region in the vicinity of the boundary between the hepatic and the cardiac regions in the three-dimensional medical image for use in training is set as the second training range. Therefore, the second training range as a local image region in the vicinity of the boundary between the hepatic and the cardiac regions is narrower in the axial tomographic images included in the three-dimensional medical image for use in training than the first training range targeting the axial tomographic images including at least either one of the hepatic and the cardiac regions. More specifically, the first and the second training datasets are subjected to different training ranges in the three-dimensional medical image for use in training. The training range of the second training dataset is a narrower range than the training range of the first training dataset. The second classifier subjected to the training by the second training unit 530 in the image processing apparatus 500 has the same configuration as that of the second classifier of the second classification unit 150 in the image processing apparatus 100. More specifically, the classifier subjected to the training by the second training unit 530 is the 3D-U-Net. The second training unit 530 trains the 3D-U-Net to acquire the weight of the 3D-U-Net network as the parameter for the second classifier. At least a part of the components of the image processing apparatus 500 illustrated in FIG. 5 may be implemented as an independent apparatus or as software for implementing each function. In the present exemplary embodiment, each of the components is implemented by software.

A hardware configuration of the image processing apparatus 500 is similar to the hardware configuration at the time of inference illustrated in FIG. 2, and redundant descriptions thereof will be omitted.

(Processing)

Figure 6A:
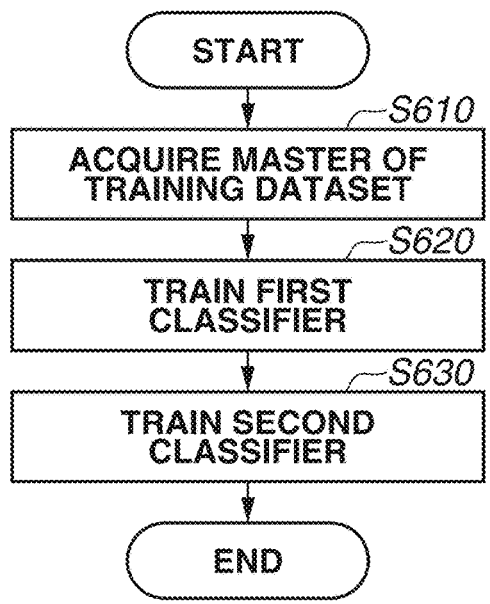
FIGS. 6A, 6B, and 6C are diagrams illustrating examples of processing related to training in the image processing apparatus according to the first exemplary embodiment.
Figure 6B:
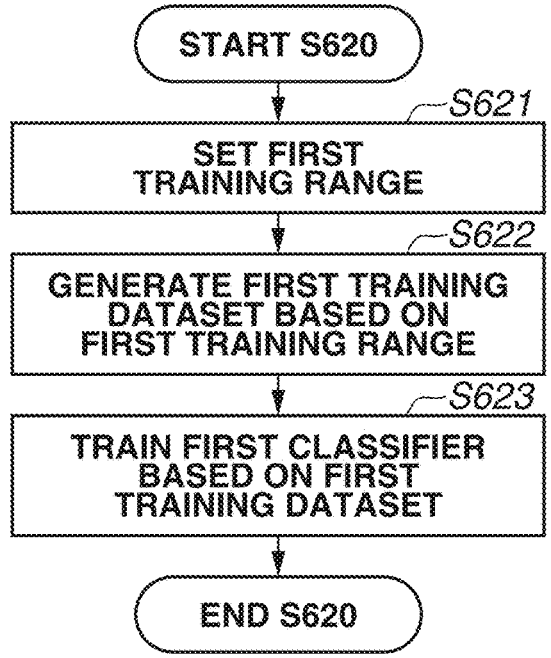
Figure 6C:
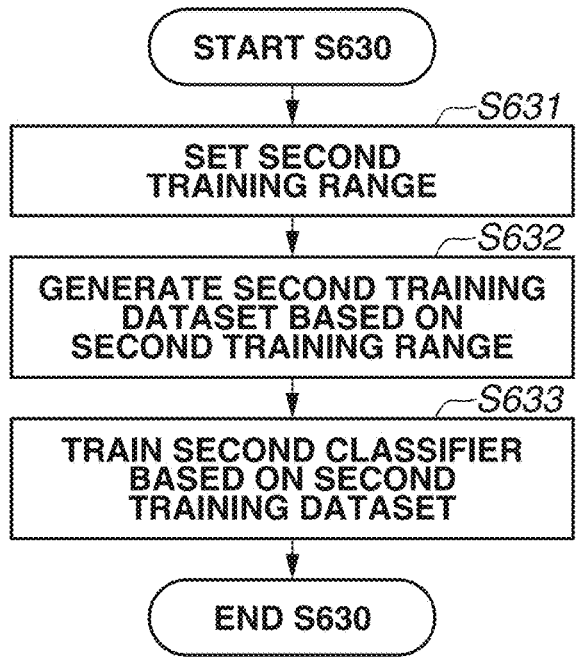

Processing of the image processing apparatus 500 according to the present exemplary embodiment will be described below with reference to FIGS. 6A, 6B, and 6C.

(S610)

In S610, the training data acquisition unit 510 receives one or more pieces of the training data from the storage device 70 and configures the master of the training dataset. Then, the training data acquisition unit 510 transmits the master of the training dataset to the first training unit 520 and the second training unit 530.

(S620)

In S620, the first training unit 520 receives the master of the training dataset from the training data acquisition unit 510. Then, the first training unit 520 sets the first training range in the three-dimensional medical image for use in training as training data included in the master of the training dataset, and preprocesses each piece of the training dataset according to the first training range, to generate a first training dataset. Then, the first training unit 520 trains the first classifier using the first training dataset and records the parameter for the first classifier acquired by the training in the storage device 70.

S620 will be described in detail below with reference to FIG. 6B.

(S621)

In S621, the first training unit 520 sets the first training range to be subjected to the training of the 2D-U-Net as the first classifier.

According to the present exemplary embodiment, the first training range is the axial tomographic images including at least either one of the hepatic and the cardiac regions in the three-dimensional medical image for use in training included in the training data. Therefore, in this operation, the first training unit 520 scans the ground truth image of the hepatic region and the ground truth image of the cardiac region configuring the training data for each axial tomographic image, and acquires a set of slice indexes of the axial tomographic images including the hepatic ground truth region or the cardiac ground truth region. The first training unit 520 sets the set of slice indexes as the first training range to be subjected to the training of the 2D-U-Net. The first training unit 520 performs similar processing on all of the training data to set the first training range in each piece of the training data.

(S622)

In S622, the first training unit 520 generates a first training dataset from the master of the training dataset based on the first training range set in S621.

The first training unit 520 sets the first training range in each three-dimensional medical image for use in training as the training data included in the master of the training dataset in S621. Therefore, in S622, the first training unit 520 extracts axial tomographic images included in the first training range in each piece of the training data and the two-dimensional ground truth image corresponding to the axial tomographic images, to generate respective partial images. The first training unit 520 uses these partial images as new training data to configure a first training dataset. Therefore, the first training dataset includes only images including at least either one of the hepatic and the cardiac regions.

(S623)

In S623, the first training unit 520 trains the first classifier using the first training dataset. Then, the first training unit 520 records the parameter for the first classifier acquired by the training in the storage device 70.

According to the present exemplary embodiment, the first classifier subjected to the training by the first training unit 520 is the 2D-U-Net, and the parameter for the first classifier is the weight of the 2D-U-Net network.

Therefore, in S623, the first training unit 520 inputs the training data to the 2D-U-Net for each axial tomographic image, and updates the weight of the network by the back propagation as a known method. The first training unit 520 performs this update processing at least once using all or part of the training data included in the first training data, to acquire the weight of the 2D-U-Net network for extracting the hepatic and the cardiac regions from the three-dimensional tomographic image.

Even when the first classifier is Support Vector Machine or AdaBoost, the first training unit 520 may determine the parameter for the classifier by a known method using the first training dataset. The parameter for each classifier is as described above.

As described above, the first training unit 520 trains the 2D-U-Net as the first classifier using the training dataset and records the weight of the 2D-U-Net network acquired through the training in the storage device 70.

Although, in the above descriptions, the first training range is set to the axial tomographic images including at least either one of the hepatic and the cardiac regions, some embodiments are not limited thereto. For example, all of the axial tomographic images included in the three-dimensional medical image for use in training may be set as the first training range. More specifically, the master of the training dataset is identical to the first training dataset. When the first training range is set in this way, the possibility of an isolated noise region extraction in the axial tomographic images including neither the hepatic nor the cardiac region becomes smaller than the possibility thereof in the case of the training only using a range including at least either one of the hepatic and the cardiac regions. In addition, any training range may be set as long as the entire hepatic region can be extracted from the three-dimensional tomographic image.

(S630)

In S630, the second training unit 530 receives the master of the training dataset from the training data acquisition unit 510. Then, the second training unit 530 sets a second training range for the training data included in the master of the training dataset and preprocesses each piece of the training dataset according to the second training range, to generate a second training dataset. Then, the second training unit 530 trains the second classifier using the second training dataset and records the parameter for the second classifier acquired by the training in the storage device 70.

S630 will be described in detail below with reference to FIG. 6C.

(S631)

In S631, the second training unit 530 sets the second training range to be subjected to the training of the 3D-U-Net as the second classifier. According to the present exemplary embodiment, the second training range is set to a local image region in the vicinity of the boundary between the hepatic and the cardiac regions in the three-dimensional medical image for use in training included in the training data. Since the first training range is set to the axial tomographic images including at least either one of the hepatic and the cardiac regions, the second training range is smaller than the first training range in the three-dimensional medical image for use in training. Therefore, in this operation, the second training unit 530 first scans the ground truth image of the hepatic region and the ground truth image of the cardiac region included in the training data for each axial tomographic image, and acquires a plurality of axial tomographic images including both the hepatic and the cardiac ground truth regions. Then, for the plurality of axial tomographic images including both the hepatic and the cardiac ground truth regions, the second training unit 530 determines the smallest bounding box enclosing the hepatic and the cardiac ground truth regions. The smallest bounding box enclosing the hepatic and the cardiac ground truth regions is the second training range. The second training unit 530 performs similar processing to all of the training data to set the second training range for each piece of the training data.

(S632)

In S632, the second training unit 530 generates a second training dataset from the master of the training dataset based on the second training range set in S631.

The second training unit 530 sets the second training range for each piece of the teaching data included in the master of the training dataset in S631. Therefore, in S631, the second training unit 503 extracts the pixels included in the second training range for each piece of the training data to generate partial images of the three-dimensional medical image for use in training and the ground truth image, and sets these images as new training data to configure a second training dataset. This enables acquiring the second training dataset including partial images in the vicinity of the boundary between the liver and the heart.

The bounding box 730 illustrated in FIGS. 7A to 7D is the image region representing the partial images generated in the S632. The bounding box 730 encloses the liver and the heart, and the boundary lies between the two organs.

(S633)

In S633, the second training unit 530 trains the second classifier using the second training dataset. Then, the second training unit 530 records the parameter for the second classifier acquired by the training in the storage device 70.

According to the present exemplary embodiment, the second classifier is the 3D-U-Net, and the parameter for the second classifier is the weight of the 3D-U-Net network. The second training unit 530 performs similar training to that in S623.

As described above, the second training unit 530 trains the 3D-U-Net using the training dataset and records the weight of the 3D-U-Net network acquired by the training in the storage device 70.

Although, in the 632, the second training unit 530 generates one partial image only from the pixels included in the second training range, the second training unit 530 may add margins to the second training range when generating partial images. For example, in a case where the second training range is set to [(x_0, y_0, z_0), (x_1, y_1, z_1)], the second training unit 530 may randomly apply a margin of pixels for 0 to 10 mm in the physical space to x_0, x_1, y_0, y_1 and a margin of pixels for 0 to 15 mm in the physical space to z_0, z_1. Alternatively, the second training unit 530 may apply a margin of a fixed value to each coordinate, or change margins while generating a plurality of partial images. This enables increasing the amount of the training data so that the robustness of the classifiers is improved. According to the above-described procedures, the image processing apparatus 500 according to the first exemplary embodiment generates the parameter for the first classifier of the first classification unit 120 and the parameter for the second classifier of the second classification unit 150 in the image processing apparatus 100.

(Variations of First Classifier)

As described above, the first classification unit 120 according to the present exemplary embodiment is a three-class classifier for classifying each of a plurality of pixels included in the three-dimensional medical image into the liver (first target region), the heart (second target region), and other organs. However, the configuration of the first classification unit 120 is not limited thereto. The first classifier in the first classification unit 120 may include a plurality of classifiers, such as a combination of a two-class classifier for classifying each of the plurality of pixels included in the three-dimensional medical image into the liver and other organs, and a two-class classifier for classifying each of the plurality of pixels included in the three-dimensional medical image into the heart and other organs. Alternatively, the first classifier may include a classifier for more than or equal to three classes for classifying each of the plurality of pixels into classes of the liver, the heart, the lung, and other organs. The classes to be classified by the first classification unit 120 are not limited to the above-described classes.

As described above, the first classifier of the first classification unit 120 according to the present exemplary embodiment is a classifier that inputs the axial tomographic images as an example of a two-dimensional image and outputs a result of extracting the target region corresponding to the input axial tomographic images. However, the input and output of the first classification unit 120 are not limited thereto. For example, the first classifier may be a classifier that inputs a three-dimensional tomographic image and outputs a result of extracting the target region corresponding to the three-dimensional tomographic image. The first classifier of the first classification unit 120 may be a classifier that inputs partial three-dimensional tomographic images included in the three-dimensional tomographic image and outputs a result of extracting the target region corresponding to the partial three-dimensional tomographic images. Instead of the above-described classifier that inputs axial tomographic images, the first classifier may be a classifier that inputs a tomographic image having an arbitrary section, such as a coronal tomographic image and a sagittal tomographic image.

(Variations of Second Classifier)

As described above, the second classifier of the second classification unit 150 according to the present exemplary embodiment is a two-class classifier for classifying each of the plurality of pixels included in the three-dimensional medical image into the liver (first target region) and other organs. However, the configuration of the second classification unit 150 is not limited thereto. For example, the second classifier of the second classification unit 150 may be a two-class classifier for classifying each of the plurality of pixels included in the three-dimensional medical image into the heart (second target region) and other organs. In this case, the integration unit 160 integrates the global likelihood image of the hepatic region acquired by the first classification unit 120 and the local likelihood image of the cardiac region acquired by the second classification unit 150. The two images may be integrated by, for example, the following formula (2:

$$p_{merge}^{liver}(i) = \begin{cases} 1 - p_{local}^{heart}(i) & i \in \Omega_{local}, p_{local}^{heart}(i) \geq s \\ p_{global}^{liver}(i) & \text{otherwise} \end{cases} \quad (2)$$

where $p_{local}^{heart}(i)$ is a pixel value of the local likelihood image of the cardiac region, and s is a threshold value for the pixel value. This formula means that, when the second classification unit 150 estimates that the likelihood of the cardiac region is high for a certain pixel in the image region, the likelihood of the hepatic region is calculated based on the likelihood of the cardiac region estimated by the second classification unit 150.

The second classification unit 150 may include a classifier for two or more classes for classifying each of the plurality of pixels into the hepatic class, the cardiac class, and other organs' class, or include a plurality of classifiers, such as a combination of a two-class classifier for classifying each of the pixels into the hepatic class and other organs' class and a two-class classifier for classifying each of the pixels into the cardiac class and other organs' class. More specifically, the plurality of classifiers of the second classification unit 150 includes at least a classifier trained based on machine-learning to classify a plurality of classes including the class representing the first target region, and a classifier trained based on machine-learning to classify a plurality of classes including the class representing the second target region. In these cases, the integration unit 160 may use any integration method for acquiring a result of extracting the hepatic region as the target object for segmentation. For example, the integration unit 160 may integrate only the global likelihood image of the hepatic region by the first classifier and the local likelihood image of the hepatic region by the second classifier, or perform the integration based on formula 2 using only the global likelihood image of the hepatic region and the local likelihood image of the cardiac region. The classes into which the second classification unit 150 classifies do not need to be the above-described classes. More specifically, the second classification unit 150 in the image processing apparatus 100 includes a plurality of classifiers.

As described above, the second classifier of the second classification unit 150 according to the present exemplary embodiment inputs partial three-dimensional tomographic images in the three-dimensional tomographic image and outputs a result of the target region extraction. However, the input and output of the second classification unit 150 are not limited thereto. For example, the second classifier of the second classification unit 150 may be a classifier that inputs the two-dimensional tomographic images configuring the three-dimensional tomographic image or the partial three-dimensional tomographic image and outputs a result of extracting the target region corresponding to the two-dimensional tomographic images. In this case, the second classifier stacks the results of extracting the target region corresponding to the two-dimensional tomographic images to generate a result of extracting the target region corresponding to the three-dimensional tomographic image.

In a case where the first classification unit 120 extracts the first target region and a plurality of target regions adjacent to the first target region, the second classification unit 150 may include a plurality of classifiers different for each adjacent target region. In the following example, the first classification unit 120 extracts the first target region (liver), the second target region (heart) adjacent to the first target region, and the third target region (small intestine) adjacent to the first target region, different from the second target region. In this case, the identification unit 130 identifies axial tomographic images possibly including the above-described organs together based on the first classification result for each combination (the combination of the liver and the heart, and the combination of the liver and the small intestine). The determination unit 140 determines the image region to be subjected to the classification by the second classification unit 150 for each combination (the combination of the liver and the heart and the combination of the liver and the small intestine). The second classification unit 150 includes a classifier for classifying the first and the second target regions and a classifier for classifying the first and the third target regions. Each classifier classifies the respective image regions as the second classification. This enables high-accuracy extraction even when objects likely to be misclassified are adjacent to each other.

(Variations of Determination Unit)

As described above, while the determination unit 140 according to the present exemplary embodiment determines the image region to be subjected to the classification by the second classification unit 150, by applying a fixed number of margins to the smallest bounding box enclosing the hepatic and the cardiac regions in a specific range, some embodiments are not limited thereto. Alternatively, when the result of the hepatic region extraction by the first classification unit 120 has a tendency of mis-extraction of the cardiac region, the determination unit 140 does not need to apply margins to the smallest bounding box enclosing the hepatic and the cardiac regions in a specific range. In addition, the determination unit 140 may determine the size of the bounding box in such a manner that the bounding box matches the image size input to the second classification unit 150. In this case, the second classification unit 150 does not need to change the image size. When applying a fixed number of margins, the second classification unit 150 may set margin values while factoring in the margins used when the training of the classifier has been performed. For example, in a case where, to the second training range is set to [(x_0, y_0, z_0), (x_1, y_1, z_1)], the second training unit 530 randomly applies a margin of the pixels for 0 to 10 mm in the physical space to x_0, x_1, y_0, y_1, both 5 mm as the average value of margins and 10 mm as the maximum value of margins are applicable, for example. Since setting the values in this way enables adjusting the training range of the classifier at the time of training with the image regions to be subjected to the classification by the classifiers at the time of inference, the classifiers can exert their performances.

(Variations of Integration Unit)

As described above, the integration unit 160 according to the present exemplary embodiment integrates the image region to be subjected to the classification by the second classification unit 150 and only the likelihood image acquired by the second classification unit 150. However, the integration unit 160 may also use the likelihood image acquired by the first classification unit 120. For example, the integration unit 160 may use the pixel values of the likelihood image acquired by the first classification unit 120 for the pixels at the edges of the image region to be subjected to the classification by the second classification unit 150, and use the pixel values of the likelihood image acquired by the second classification unit 150 for the pixels inside of the image region. Using the pixel values in this way enables the integration in such a manner that a favorable result can be acquired when the classifier of the second classification unit 150 provides low accuracy of extracting the edges of the image region. In addition, the integration unit 160 may perform the weighted average value integration. This method integrates the pixel values of the likelihood image acquired by the first classification unit 120 and the pixel values of the likelihood image acquired by the second classification unit 150 on a weighted average basis for the pixels included in the image region to be subjected to the classification by the second classification unit 150. In this case, for example, a weight of 0.75 is applied to the pixel values of the likelihood image of the hepatic region acquired by the second classification unit 150, and a weight of 0.25 is applied to the pixel values of the likelihood image of the hepatic region acquired by the first classification unit 120. Setting the weight in this way enables focusing on the result of the hepatic region extraction acquired by the second classification unit 150 for the image region. Alternatively, the integration unit 160 may perform the maximum value integration (or minimum value integration). For each pixel of the image region, the method compares the pixel values of the likelihood image of the hepatic region acquired by the first classification unit 120 with the pixel values of the likelihood image of the hepatic region acquired by the second classification unit 150, and then selects the maximum value (or minimum value). The integration unit 160 may perform threshold value processing on the likelihood image of the hepatic region acquired by the first classification unit 120 and the likelihood image of the hepatic region acquired by the second classification unit 150 to generate the respective mask images. Then, the integration unit 160 may perform the integration by taking the logical AND (or OR) between the generated mask images on the pixels included in the image regions. When the first classification unit 120 has a tendency of mis-extraction, performing the integration with the AND operation enables reducing or preventing mis-extraction. Meanwhile, when the first classification unit 120 has a tendency of insufficient extraction, performing the integration with the OR operation enables reducing or preventing insufficient extraction.

More specifically, for the pixels included in the image region in the three-dimensional medical image, the integration unit 160 integrates the first and the second classification results by either one of integration methods, i.e., the weighted average value integration, the maximum value integration, the logical sum integration, and the logical product integration, to acquire the third classification result.

(Variations of Image Processing Apparatus)

As described above, in the image processing apparatus 100 according to the present exemplary embodiment, the identification unit 130 identifies axial tomographic images including both the hepatic and the cardiac regions. However, in a case where the axial tomographic images cannot be identified, the identification unit 130 may end processing and set the extraction result by the first classification unit 120 as the final output.

While, as described above, the first classification unit 120, the second classification unit 150, and the integration unit 160 according to the present exemplary embodiment output a likelihood image as a result of the target region extraction, some embodiments are not limited thereto. For example, threshold value processing is performed on the likelihood image to generate a mask image of the target region, and then the mask image is output as a result of the target region extraction. Alternatively, the maximum connected region component may be acquired for the mask image of the target region, and then the isolated noise region may be deleted. Further, elaborating each region by a known image procession method may be performed after processing by each unit. For example, the graph cut method and the Level Set method may be additionally applied to the postprocessing so that the result of the target region extraction coincides with the outline of the three-dimensional tomographic image. The graph cut method generates a try map represented by the foreground region, the background region, and undetermined regions based on the likelihood image as a result of the target region extraction. Then, the method configures a graph, applies energy to each edge in the graph, and performs minimum clipping by a known method to divide the regions. The Level Set method subjects the likelihood image to threshold processing to define the initial regions. Then, the method defines the energy and minimizes the energy with a known method to divide the regions, whereby a result of extracting the target region coinciding with the outline can be acquired.

As described above, a target region can be extracted with high accuracy using the first classifier capable of extracting the region of the target object (liver) from the three-dimensional tomographic image and the second classifier dedicated for a specific range where the first classifier is likely to fail in the region extraction.

According to the first exemplary embodiment, the first classification unit 120 extracts the first and the second target regions and identifies two-dimensional tomographic images including both of the two target regions based on the results of extracting the two target regions, to determine the image region likely to be misclassified. However, when the positional relation between of the first and the second target regions is almost predetermined as is the case with the human body structures, the first classification unit 120 can identify a portion where misclassification is likely to occur, based on prior information about the relative position between the two target regions. For example, the hepatic region (first target region) is in contact with the lower portion of the cardiac region (second target region). Using such prior information about the relative position enables the identification unit 130 to identify axial tomographic images possibly including both the first and the second target regions even when the first classification unit 120 extracts only the first target region. The second exemplary embodiment will be described below centering on an example case where, as described above, the prior information about the relative position between the target regions and the result of the first target region extraction by the first classification unit 120 are used to identify axial tomographic images possibly including both the first and the second target regions, and where the determination unit 140 determines the image region to be subjected to the classification by the second classification unit 150 based on the specific information by the identification unit 130. More specifically, in the image processing apparatus 100, the acquisition unit 110 further acquires the prior information about the relative position between the first and the second target regions, and the identification unit 130 identifies the tomographic image including the first and the second target regions based on the first classification result and the prior information about the relative position.

According to the present exemplary embodiment, firstly, the first classifier of the first classification unit 120 extracts the hepatic region from the three-dimensional tomographic image. Then, the identification unit 130 identifies axial tomographic images possibly including both the liver and the heart based on the hepatic region extracted by the first classification unit 120 and the prior information about the relative position. The determination unit 140 further determines an image region as the input of the second classifier based on the axial tomographic images identified by the identification unit 130, and the second classifier of the second classification unit 150 extracts the hepatic region from the image region. Lastly, the integration unit 160 integrates the hepatic region extracted by the first classifier and the hepatic region extracted by the second classifier to generate a result of the hepatic region extraction acquired after the integration.

According to the present exemplary embodiment, the first classifier of the first classification unit 120 and the second classifier of the second classification unit 150 use the 2D-U-Net. These classifiers are configured by the weight of different networks.

Hereinafter, when referring to the relative position in the three-dimensional tomographic image, the head side of the human body is referred to the top side, and the leg side of the human body is referred to the bottom side.

The configuration of the image processing apparatus according to the present exemplary embodiment is the same as that of the image processing apparatus 100 according to the first exemplary embodiment. The function configuration of the image processing apparatus 100 according to the present exemplary embodiment will be described below with reference to FIG. 1. In the following descriptions, redundant descriptions about the image processing apparatus 100 according to the first exemplary embodiment will be omitted.

Each component of the image processing apparatus 100 will be described below.

Processing performed by the acquisition unit 110 according to the present exemplary embodiment is similar to that of the acquisition unit 110 according to the first exemplary embodiment.

The first classification unit 120 according to the present exemplary embodiment is almost similar to the first classification unit 120 according to the first exemplary embodiment but differs therefrom in the following points. According to the present exemplary embodiment, the target region that is extracted by the first classification unit 120 is only the hepatic region. More specifically, the first classification unit 120 generates a likelihood image representing the hepatic region as the first classification result.

The identification unit 130 receives the likelihood image of the hepatic region as the first classification result from the first classification unit 120, and receives information about the relative position between the liver and the heart from the storage device 70. Then, the identification unit 130 identifies one or more axial tomographic images including both the liver and the heart based on the prior information about the relative position between the liver (first target region) and the heart (second target region) and the likelihood image of the hepatic region received from the first classification unit 120. Then, the identification unit 130 transmits the specific information as information about the identified axial tomographic images to the determination unit 140. According to the present exemplary embodiment, the specific information is the slice index of one axial tomographic image including the upper edge of the hepatic region.

The determination unit 140 receives the slice indexes as the specific information from the identification unit 130. Then, the determination unit 140 determines the image region to be subjected to the classification by the second classification unit 150 based on the received slice indexes and the prior information about the relative position between the liver and the heart. Then, the determination unit 140 transmits the image region to be subjected to the classification to the second classification unit 150 and the integration unit 160. According to the present exemplary embodiment, the image region to be subjected to the classification by the second classification unit 150 is the slice indexes representing the plurality of axial tomographic images included in the three-dimensional tomographic image. More specifically, the determination unit 140 selects a plurality of axial tomographic images possibly including both the hepatic and the cardiac regions based on the axial tomographic image including the upper edge of the hepatic region identified by the identification unit 130, and determines the slice indexes of the plurality of selected axial tomographic images as an image region.

The second classification unit 150 receives the axial tomographic images and the parameter for the second classifier from the acquisition unit 110, and receives the slice indexes of the plurality of three-dimensional tomographic images as the image region to be subjected to the classification by the second classification unit 150 from the determination unit 140. Then, the second classification unit 150 configures the 2D-U-Net based on the weight of the network as the parameter for the second classifier. Then, using the 2D-U-Net, the second classification unit 150 extracts the hepatic region as a target region from the plurality of axial tomographic images, and generates a local likelihood image of the hepatic region as the second classification result. Lastly, the second classification unit 150 transmits the local likelihood image of the hepatic region to the integration unit 160.

Processing performed by the integration unit 160 according to the present exemplary embodiment is similar to that of the integration unit 160 according to the first exemplary embodiment.

(Processing Procedure)

Processing procedure of the image processing apparatus 100 according to the present exemplary embodiment will be described below with reference to FIG. 3. In the processing, descriptions of operations similar to the above-described operations illustrated in FIG. 3 will be omitted, and descriptions will be given of only differences.

(S310)

Processing in S310 according to the present exemplary embodiment is identical to the processing in S310 according to the first exemplary embodiment, and redundant descriptions thereof will be omitted.

(S320)

Processing in S320 according to the present exemplary embodiment is different from the processing in S320 according to the first exemplary embodiment in the following points. The first classification unit 120 according to the present exemplary embodiment extracts the hepatic region as a first target region from the three-dimensional tomographic image. More specifically, the first classification unit 120 does not extract the cardiac region.

The 2D-U-Net as the first classifier that is used by the first classification unit 120 is configured using the weight of the network trained to extract the hepatic region from the two-dimensional tomographic images included in the three-dimensional tomographic image. The weight of the network as the parameter for the first classifier that is used by the first classification unit 120 is acquired by the training to extract the hepatic region from the three-dimensional tomographic image.

(S330)

In S330, the identification unit 130 receives the global likelihood image of the hepatic region as a result of the hepatic region extraction from the first classification unit 120. Then, the identification unit 130 identifies axial tomographic images including both the hepatic and the cardiac regions based on the global likelihood image of the hepatic region and the prior information about the relative positional relation between the hepatic and the cardiac regions. This enables identifying axial tomographic images including the liver and the heart are drawn. Then, the identification unit 130 transmits the slice indexes of the identified axial tomographic images to the determination unit 140 as the specific information.

According to the present exemplary embodiment, the prior information about the relative positional relation is the vertical relation inside the human body, i.e., the heart is located above the liver. Therefore, by identifying axial tomographic images including the upper edge of the liver, the identification unit 130 can identify axial tomographic images including both the liver and the heart. Therefore, using the result of the hepatic region extraction, the identification unit 130 identifies axial tomographic images including the upper edge of the liver.

According to the present exemplary embodiment, the result of the hepatic region extraction is the likelihood images of the hepatic region. Therefore, the identification unit 130 first performs threshold processing on subjects these likelihood images using a threshold value t=0.5 to generate temporary hepatic region masks. Since an isolated noise region may possibly appear in these temporary region masks, the accuracy of identifying the upper edge of the hepatic region can decrease. In this case, the identification unit 130 may delete the isolated noise region by acquiring the maximum connected region component of the temporary region masks.

As described above, using the first target region and the prior information about the positional relation between the first and the second target regions, the identification unit 130 identifies axial tomographic images possibly including both of the two target regions.

(S340)

In S340, the determination unit 140 receives the slice indexes as the specific information from the identification unit 130. Then, the determination unit 140 determines the image region to be subjected to the classification by the second classification unit 150, based on the slice indexes and the prior information about the relative position between the liver and the heart. Then, the determination unit 140 transmits the image region to be subjected to the classification to the second classification unit 150 and the integration unit 160.

According to the present exemplary embodiment, the specific information acquired from the identification unit 130 is the slice indexes representing the upper edge of the hepatic region extracted by the first classification unit 120. The boundary between the liver and the heart is normally in a slice below the upper edge of the liver. Therefore, according to the present exemplary embodiment, the determination unit 140 uses the prior information to determine the image region to be subjected to the classification by the second classification unit 150. However, the first classification result by the first classifier may possibly include insufficient extraction of the upper edge of the hepatic region. Therefore, based on the axial tomographic images of the upper edge of the hepatic region, the determination unit 140 may determine all of the axial tomographic images in a predetermined range which is set by factoring in the error at the upper edge of the hepatic region identified by the identification unit 130, as the image region to be subjected to the classification by the second classification unit 150. The predetermined range is set, for example, to 25 mm on the head side and 75 mm on the leg side in the physical space. The determination unit 140 determines the slice indexes of the plurality of axial tomographic images determined by the above-described processing as image regions.

As described above, the determination unit 140 determines the slice indexes of the axial tomographic images to be subjected to the classification by the second classification unit 150 as image regions.

(S350)

In S350, the second classification unit 150 receives the three-dimensional tomographic image and the parameter for the second classifier from the acquisition unit 110. The second classification unit 150 receives the slice indexes of the plurality of axial tomographic images, which are image regions to be subjected to the classification by the second classification unit 150, from the determination unit 140. Then, the second classification unit 150 configures the 2D-U-Net based on the weight of the network as the parameter for the second classifier. The parameter for this classifier is different from the parameter for the first classifier of the first classification unit 120, and is the result of the training using the image regions in the vicinity of the boundary between the liver and the heart. Therefore, it is expected that the 2D-U-Net of the second classification unit 150 has higher accuracy in extracting the target region in the image region than the 2D-U-Net of the first classification unit 120. The second classification unit 150 extracts the hepatic region as a target region from the plurality of axial tomographic images using the 2D-U-Net as the second classifier and generates a local likelihood image of the hepatic region as the second classification result. Lastly, the second classification unit 150 transmits the local likelihood image of the hepatic region to the integration unit 160. Processing for extracting a target region is similar to the processing in S350. More specifically, the second classification unit 150 inputs to the 2D-U-Net each axial tomographic image included in the image region to be subjected to the classification to generate a local likelihood image of the target region in the image region to be subjected to the classification by the second classification unit 150.

(S360)

Processing in S360 according to the present exemplary embodiment is identical to the processing in S360 according to the first exemplary embodiment, and redundant descriptions thereof will be omitted.

According to the above-described procedures, the image processing apparatus 100 according to the second exemplary embodiment extracts the hepatic region from the three-dimensional tomographic image.

In the training of the classifiers of the first classification unit 120 and the second classification unit 150, like the first exemplary embodiment, the first training unit 520 and the second training unit 530 of the image processing apparatus 500 need to generate each piece of the training dataset based on each training range and trains each of the classifier.

More specifically, the first classifier of the first classification unit 120 performs the training process on the same classifier as that of the first training unit 520 according to the first exemplary embodiment using the training data targeting the hepatic region to acquire the parameter for the first classifier. Meanwhile, the second classifier of the second classification unit 150 identifies axial tomographic images including the upper edge of the liver based on the hepatic ground truth region included in the training data in the second training unit 530, and sets the second training range based on the identified axial tomographic images. Then, the second training unit 530 generates a second training dataset based on the second training range and performs the training of the classifier of the second classification unit 150 using a predetermined method. According to the present exemplary embodiment, since the second classification unit 150 is the 2D-U-Net, the classifier of the second classification unit 150 according to the present exemplary embodiment inputs each axial tomographic image like the first classification unit 120 according to the first exemplary embodiment.

(Variations of Classifier)

As described above, the first classification unit 120 according to the present exemplary embodiment is a two-class classifier for classifying whether each of a plurality of pixels included in an image is the liver (first target region). However, the configuration of the first classifier of the first classification unit 120 is not limited thereto. For example, a classifier for classifying the target region into three or more classes, such as the first classifier of the first classification unit 120 according to the first exemplary embodiment, is also applicable.

Any combination of classifiers is applicable in some embodiments. For example, like the first exemplary embodiment, the first classifier of the first classification unit 120 may extract the target region by the two-dimensional processing, and the second classifier of the second classification unit 150 may extract the target region by the three-dimensional processing. Like the second exemplary embodiment, both the first classifier of the first classification unit 120 and the second classifier of the second classification unit 150 may be classifiers for extracting target regions by the two-dimensional processing. In addition, both the first classifier of the first classification unit 120 and the second classifier of the second classification unit 150 may be classifiers for performing the three-dimensional processing, or other combinations are applicable.

(Variations of Identification Unit and Determination Unit)

In a case where the second target region is included in the region extracted by the first classification unit 120, the identification unit 130 may identify the tomographic image based on the result of the second target region extraction and the prior information about the relative position between the first and the second target regions. For example, in a case where the first classification unit 120 extracts the hepatic region as the first target region and the cardiac region as the second target region, using the prior information about the hepatic region being at the lower portion of the cardiac region, the identification unit 130 can identify a tomographic image possibly including the two target regions.

Although, as described above, the identification unit 130 and the determination unit 140 according to the present exemplary embodiment use the vertical positional relation as the prior information, some embodiments are not limited thereto. For example, in a case where the extraction result by the first classification unit 120 has low accuracy in extracting the region in the vicinity of the leading edge of the left lobe of the liver (at the right-hand side of the image), the identification unit 130 identifies a sagittal tomographic image (one of two-dimensional tomographic images) representing the rightmost edge of the hepatic region extracted by the first classification unit 120. The determination unit 140 determines the image region to be subjected to the classification by the second classification unit 150 based on the sagittal tomographic image identified by the identification unit 130. In this case, the second classification unit 150 uses a trained classifier dedicated for the vicinity of the leading edge of the left lobe of the liver. In addition, the second classification unit 150 may use any piece of prior information about the relative position which enables identifying a portion where the first classification unit 120 is likely to perform misclassification. Not only the prior information about the relative position but also other prior information, such as the density value, may be used. The right kidney region will be described below as an example of an organ adjacent to the hepatic region. The right kidney region lies in the vicinity of the lower edge of the hepatic region. However, the position of the right kidney region varies in each subject. Therefore, for example, the identification unit 130 identifies a tomographic image possibly including both the two target regions using the prior information about the relative position, i.e., the right kidney region is within a predetermined distance away from the lower edge of the hepatic region, and prior information about the density value of the right kidney region. Alternatively, any piece of the prior information other than the prior information about the relative position related to the second target region is also applicable.

(Effects of Second Exemplary Embodiment)

As described above, using the first classifier of the first classification unit 120 capable of extracting the region of the target object (liver) from the three-dimensional tomographic image and the second classifier of the second classification unit 150 dedicated for a specific range where the first classifier is likely to fail in the region extraction, the target region extraction can be performed highly accurately.

The second classifier of the second classification unit 150 according to the first and the second exemplary embodiments is configured by the parameter for a classifier generated by training a specific range in the three-dimensional tomographic image. However, when classification using a classifier trained in a specific range in an image is performed, the accuracy of extracting a region in the vicinity of the specific range may decrease.

The decrease in the accuracy of extracting a region in the vicinity of the specific range may occur because the second training dataset used for the training of the second classifier of the second classification unit 150 does not include sufficient variations of the shapes of target regions at the edges of the specific range.

Description will be given of a case where the second training range is set based on the axial tomographic images including the upper edge of the liver, like the classifier of the second classification unit 150 according to the second exemplary embodiment. The second training range covers all of the axial tomographic images in a range from −25 mm to +75 mm in the physical space centering on the axial tomographic images including the upper edge of the hepatic region extracted by the first classifier of the first classification unit 120. While, in this case, the upper edge of the liver as a reference in setting the second training range is included in the training dataset, for example, the leading edge of the left lobe below the upper edge of the liver may or may not be included in the training data. More specifically, since the leading edge of the left lobe which may possibly appear at an edge of the second training range is not sufficiently be included in the second training dataset, variations of the leading edge of the left lobe cannot be sufficiently be trained, possibly degrading the accuracy of the region extraction.

The above-described problem is not limited to this example. The problem may arise as long as the second training range of the second classifier of the second classification unit 150 targets a local range in the three-dimensional tomographic image.

Possible solutions for the above-described issue include expanding the second training range for the second classifier of the second classification unit 150.

However, with the expansion of the training range, the characteristics of the second classifier become similar to the characteristics of the classifier of the first classification unit 120. Consequently, misclassification in the vicinity of the boundary between the hepatic and the cardiac regions is likely to occur. There is also an issue that the most suitable training range is sometimes absent. A third exemplary embodiment will be described below centering on a method for solving the above-described problem. More specifically, the third exemplary embodiment uses a plurality of classifiers trained in different training ranges by the second classification unit 150. To simplify descriptions, the image processing apparatus 100 according to the present exemplary embodiment is configured based on the image processing apparatus 100 according to the second exemplary embodiment. More specifically, the second classification unit 150 uses a classifier A trained in the training range which is based on the upper edge of the liver (the same classifier as the second classifier of the second classification unit 150 according to the second exemplary embodiment) and a classifier B trained in the training range which is based on the axial tomographic images on the most leg side (hereinafter at the lower edge) within the training range of the classifier A.

More specifically, the image processing apparatus 100 according to the present exemplary embodiment additionally includes the configuration of the image processing apparatus 100 according to the second exemplary embodiment and the classifier B. In accordance with this configuration change, the determination unit 140 determines the image regions to be subjected to the classification by the classifiers A and B based on the specific information identified by the identification unit 130. For convenience, hereinafter, the image regions to be subjected to the classification by the classifiers A and B are referred to as image regions A and B, respectively. The image region B overlaps with a part of the image region A on the leg side (hereinafter referred to as a lower portion). More specifically, the classifier B is dedicated for the image region B in the vicinity of the lower portion of the image region A. More specifically, the plurality of classifiers of the second classification unit 150 include classifiers trained based on training datasets targeting different training ranges in the three-dimensional medical image for use in training.

The configuration of the image processing apparatus 100 according to the present exemplary embodiment is the same as that of the image processing apparatus 100 according to the second exemplary embodiment. The function configuration of the image processing apparatus 100 according to the present exemplary embodiment will be described below with reference to FIG. 1. In the descriptions, redundant descriptions about those of the image processing apparatus 100 according to the second exemplary embodiment will be omitted. Each component of the image processing apparatus 100 will be described below.

The acquisition unit 110 acquires the three-dimensional tomographic image, the parameter for the first classifier of the first classification unit 120, and the parameters for the classifiers A and B of the second classification unit 150 from the storage device 70. Then, the acquisition unit 110 transmits the acquired three-dimensional tomographic image to the first classification unit 120 and the second classification unit 150. The acquisition unit 110 also transmits the parameter for the classifier of the first classification unit 120 to the first classification unit 120, and transmits the parameters for the classifiers of the second classification unit 150 to the second classification unit 150.

Processing performed by the first classification unit 120 is similar to the processing of the first classification unit 120 according to the second exemplary embodiment.

Processing performed by the identification unit 130 is similar to the processing of the identification unit 130 according to the second exemplary embodiment.

The determination unit 140 receives the slice indexes as the specific information from the identification unit 130. Then, the determination unit 140 determines the image region A to be subjected to the classification by the classifier A of the second classification unit 150, based on the received slice indexes and the prior information about the relative position between the liver and the heart.

The determination unit 140 further determines the image region B to be subjected to the classification by the classifier B based on the image region A. Then, the determination unit 140 transmits the image regions A and B to be subjected to the classification by the classifiers A and B, respectively, to the second classification unit 150 and the integration unit 160.

According to the present exemplary embodiment, the image region to be subjected to the classification by the second classification unit 150 is a slice indexes representing a plurality of axial tomographic images included in the three-dimensional tomographic image. More specifically, the determination unit 140 selects a plurality of axial tomographic images possibly including both the hepatic and the cardiac regions with reference to the axial tomographic images including the upper edge of the hepatic region identified by the identification unit 130, and determines the slice indexes of the plurality of axial tomographic images as the image region A. Then, the determination unit 140 selects a plurality of axial tomographic images with reference to the axial tomographic images the lower edge of the image region A, and determines the slice indexes representing the determined plurality of axial tomographic images as the image region B.

The second classification unit 150 receives the three-dimensional tomographic image and the parameters for the classifiers A and B from the acquisition unit 110, and receives the image regions to be subjected to the classification by the classifiers A and B from the determination unit 140. Then, the second classification unit 150 configures the classifiers A and B based on the parameters for the classifiers A and B, respectively, received from the acquisition unit 110. The two classifiers of the second classification unit 150 are the 2D-U-Nets. Therefore, the parameter for each classifier is the weight of the network. Then, for the image region A, the second classification unit 150 extracts a target region using the 2D-U-Net as the classifier A and generates a local likelihood image of the hepatic region. Likewise, for the image region B, the second classification unit 150 extracts a target region using the 2D-U-Net as the classifier B and generates a local likelihood image of the hepatic region. The second classification unit 150 transmits the local likelihood images of the hepatic region of the two classifiers to the integration unit 160.

Figure 10:
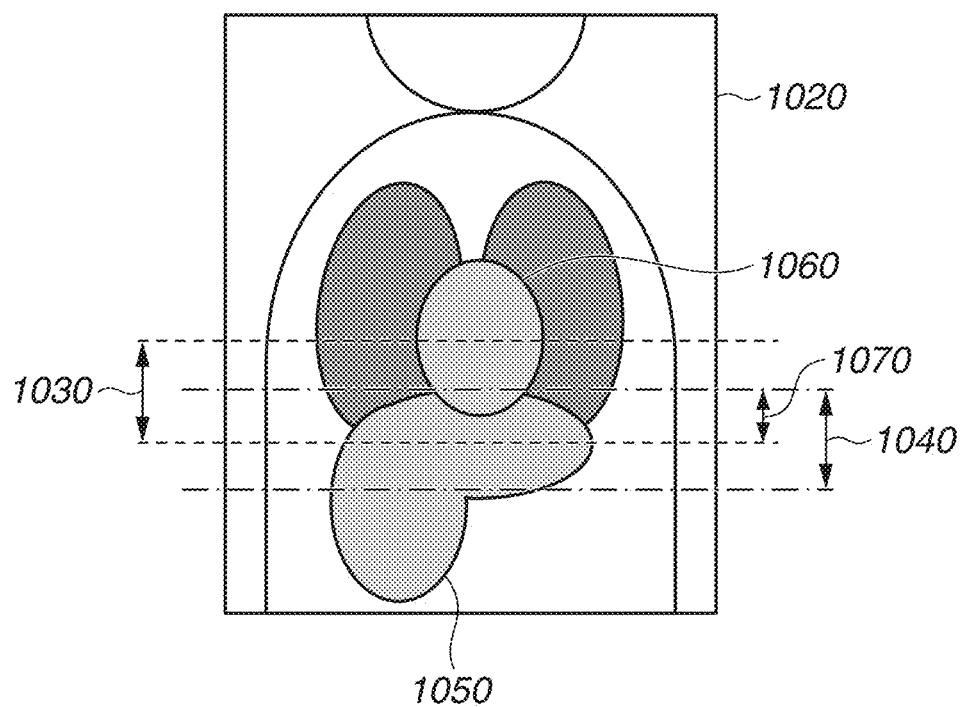
FIG. 10 is a diagram illustrating an example of an image according to the third exemplary embodiment.

The image regions A and B will be described below with reference to FIG. 10. FIG. 10 illustrates a coronal tomographic image 1020 configuring a three-dimensional tomographic image. An overlapping image region (an image region c 1070) between an image region A 1030 to be subjected to the classification by the classifier A and an image region B 1040 to be subjected to the classification by the classifier B. As described above, the image region A 1030 is determined with reference to the axial tomographic images including the upper edge of the result of the hepatic region extraction by the first classification unit 120. The image region B 1040 is determined with reference to the axial tomographic images at the lower edge of the image region A 1030. According to the present exemplary embodiment, the target regions to be extracted by the classifiers A and B of the second classification unit 150 are hepatic regions, and the two classifiers generate local likelihood images of the hepatic region. The classifier A of the second classification unit 150 is configured by the parameter for the classifier acquired by the training in a training range equivalent to the image region A 1030. The classifier B of the second classification unit 150 is configured by the parameter for the classifier acquired by the training in a training range equivalent to the image region B 1040.

The integration unit 160 integrates the global likelihood image generated by the classifier of the first classification unit 120 based on the image regions A and B received from the determination unit 140 and the local likelihood image generated by the classifiers A and B of the second classification unit 150 trained in different training ranges in the three-dimensional medical image to generate an integrated likelihood image. According to the present exemplary embodiment, the target object to the segmentation is the liver. Therefore, the integration unit 160 integrates the global likelihood image of the hepatic region generated by the classifier of the first classification unit 120 and the local likelihood image of the hepatic regions generated by the classifiers A and B of the second classification unit 150 to generate an integrated likelihood image of the hepatic region. More specifically, the integration unit 160 performs the integration processing according to the training ranges of the classifiers.

(Processing)

Processing of the image processing apparatus 100 according to the present exemplary embodiment will be described below with reference to FIG. 9.

(S910)

In S910, the acquisition unit 110 acquires the three-dimensional tomographic image, the parameter for the classifier of the first classification unit 120, and the parameters for the classifiers A and B of the second classification unit 150 from the storage device 70.

(S920)

Processing in S920 is identical to the processing in S320 according to the second exemplary embodiment, and redundant descriptions thereof will be omitted.

(S930)

Processing in S930 is identical to the processing in S330 according to the second exemplary embodiment, and redundant descriptions thereof will be omitted.

(S940)

In S940, the determination unit 140 receives the slice indexes as the specific information from the identification unit 130. The determination unit 140 determines the image region A to be subjected to the classification by the classifier A of the second classification unit 150 based on the received slice indexes and the prior information about the relative position between the liver and the heart. The determination unit 140 further determines the image region B to be subjected to the classification by the classifier B based on the image region A. Then, the determination unit 140 transmits the image regions A and B to be subjected to the classification by the classifiers A and B, respectively, to the second classification unit 150 and the integration unit 160.

The classifier A of the second classification unit 150 according to the present exemplary embodiment is identical to the classifier of the second classification unit 150 according to the second exemplary embodiment. Therefore, the image region A is determined by the same processing as the processing of the determination unit 140 according to the second exemplary embodiment. More specifically, with reference to the upper edge of the liver, the determination unit 140 determines, as the image region A, the slice indexes of all of the axial tomographic images in a range set to 25 mm on the head side and a 75 mm on the leg side. Then, the determination unit 140 determines the image region B based on the image region A. According to the present exemplary embodiment, since the classifier B is used for the purpose of improving the low accuracy in extracting the hepatic region at the lower edge of the image region A (such as the leading edge of the left lobe), the determination unit 140 determines the image region B with reference to the axial tomographic images at the lower edge of the image region A. More specifically, firstly, the determination unit 140 acquires the axial tomographic images at the lower edge of the image region A. Then, the determination unit 140 selects all of the axial tomographic images included in a predetermined range centering on the axial tomographic images, and determines the slice indexes of all of the selected axial tomographic images as the image region B. The predetermined range is set, for example, as 50 mm on the head side and 50 mm on the leg side. As described above, the determination unit 140 determines the image regions A and B to be subjected to the classification by the classifiers A and B of the second classification unit 150, respectively.

(S950)

In S950, the second classification unit 150 receives the three-dimensional tomographic image and the parameters for the classifiers A and B from the acquisition unit 110, and receives the image regions A and B to be subjected to the classification by the classifiers A and B, respectively, from the determination unit 140. Then, the second classification unit 150 configures the classifiers A and B based on the parameters for the classifiers A and B, respectively, received from the acquisition unit 110. Then, for the image region A, the second classification unit 150 extracts the hepatic region using the classifier A and generates a local likelihood image of the liver for the image region A. Likewise, for the image region B, the second classification unit 150 extracts the target region using the classifier B and generates a local likelihood image of the hepatic region for the image region B. The second classification unit 150 transmits the local likelihood images of the hepatic region acquired by the two classifiers to the integration unit 160. According to the present exemplary embodiment, the classifiers A and B of the second classification unit 150 are the 2D-U-Nets. Therefore, in this operation, the second classification unit 150 extracts the hepatic region from the image regions A and B using the classifiers A and B of the second classification unit 150, respectively, and generates a local likelihood image of the liver, by similar processing to that for the second classification unit 150 according to the second exemplary embodiment. The characteristics of the classifiers A and B will be described below. The parameter for the classifier A is a result of setting the image region in the vicinity of the boundary between the liver and the heart as a training range (a range equivalent to the image region A) and the training. Therefore, it is expected that the classifier A has higher accuracy in extracting the target region in the image region than that of the 2D-U-Net as the first classifier of the first classification unit 120. However, the classifier A may have low accuracy of extracting the hepatic region appearing in the vicinity of the lower edge of the image region A. Meanwhile, the parameter for the classifier B is a result of the training in the training range (a range equivalent to the image region B) centering on the lower edge of the training range of the classifier A. Therefore, it is expected that the classifier B has high accuracy in extracting the target region in the vicinity of the lower edge of the image region A.

As described above, the second classification unit 150 generates a local likelihood image of the hepatic region corresponding to the image region A using the classifier A (2D-U-Net). Likewise, the second classification unit 150 generates a local likelihood image of the hepatic region corresponding to the image region B using the classifier B (2D-U-Net).

(S960)

In S960, the integration unit 160 integrates the global likelihood image of the hepatic region generated by the first classification unit 120 and the local likelihood image of the hepatic region generated by the second classification unit 150, based on the image regions A and B received from the determination unit 140. Then, the integration unit 160 generates a likelihood image of the hepatic region after the integration.

According to the present exemplary embodiment, for the image region A, the integration unit 160 performs the weighted average value integration using the local likelihood images acquired by the classifiers A and B of the second classification unit 150 for each pixel. As described above, the classifier A has low accuracy in extracting the target region in the vicinity of the lower edge of the image region A. Therefore, in the vicinity of the lower edge of the image region A, for example, the integration unit 160 focuses on the pixel values (likelihood) of the local likelihood image acquired by the classifier B by relatively reducing the weight for the pixel values of the local likelihood image acquired by the classifier A. However, for an image region in the image region A not overlapping with the image region B, the integration unit 160 uses only the pixel values of the local likelihood image acquired by the classifier A. Then, for an image region in the image region B not overlapping with the image region A, the integration unit 160 performs the weighted average value integration for each pixel using the local likelihood image acquired by the classifier B and the global likelihood image acquired by the first classification unit 120. Like the classifier A, the classifier B may also have low accuracy in extracting the target region in the vicinity of the edge of the image region B. Therefore, in the vicinity of the lower edge of the image region B, for example, the integration unit 160 focuses on the pixel values of the global likelihood image acquired by the first classification unit 120 by relatively reducing the weight for the pixel values of the local likelihood image acquired by the classifier B. Lastly, the integration 106 integrates the remaining image regions (image regions other than the image regions A and B) using only the pixel values of the global likelihood image acquired by the first classification unit 120. Performing this processing integrates the likelihood images to generate an integrated likelihood image. The integration method performed by the integration unit 160 is not limited to the above-described method. Any one of the integration methods according to the first exemplary embodiment is applicable. In addition, any combination of a plurality of integration methods is also applicable to the integration. For example, the weighted average value integration may be used for a certain image region (image region A) and the logical sum integration may be used for another image region (an image region in the image region B not overlapping with the image region A). In addition, any integration method is applicable as long as the training range and characteristics of each classifier are taken into consideration.

As described above, the integration unit 160 integrates the global likelihood image of the hepatic region generated by the first classifier of the first classification unit 120 and the local likelihood image of the hepatic region generated by the classifiers A and B of the second classification unit 150 to generate an integrated likelihood image of the hepatic region.

The image processing apparatus 100 according to the third exemplary embodiment extracts the hepatic region from the three-dimensional tomographic image according to the above-described procedures.

The training of the first classifier of the first classification unit 120 and the classifier A of the second classification unit 150 is similar to the training thereof according to the second exemplary embodiment. In the training of the classifier B of the second classification unit 150, a training range (a local range equivalent to the image region B) is set centering on the lower edge of the training range of the classifier A of the second classification unit 150, a training dataset for the classifier B is generated, and the training of the classifier B is performed using a predetermined method.

As described above, using a first classifier capable of extracting the region of the target object (liver) from the three-dimensional tomographic image and a plurality of second classifiers dedicated for a specific range where the first classifier is likely to fail in the region extraction, a target region can be extracted with high accuracy.

OTHER EMBODIMENTS

Some embodiment(s) of can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2019-199101, which was filed Oct. 31, 2019 and which is hereby incorporated by reference herein in its entirety.

What is claimed is:

1. An image processing apparatus comprising:
   an acquisition unit configured to acquire a three-dimensional medical image;
   a first classification unit configured to classify each of a plurality of pixels included in the three-dimensional medical image acquired by the acquisition unit into a plurality of classes to acquire a first classification result, the classifying being performed using a first classifier trained based on machine-learning to classify each pixel into the plurality of classes including a class representing a first target region;
   a determination unit configured to determine an image region including at least the first target region and a second target region from the three-dimensional medical image as an image region to be subjected to classification, based on the first classification result;
   a second classification unit configured to classify each of a plurality of pixels included in the image region determined by the determination unit into a plurality of classes to acquire a second classification result, the classifying being performed using a second classifier trained based on machine-learning to classify each pixel into the plurality of classes including at least either one of a class representing the first target region and a class representing the second target region; and
   an integration unit configured to integrate the first and the second classification results to acquire a third classification result.

2. The image processing apparatus according to claim 1, further comprising:
an identification unit configured to identify at least one tomographic image of tomographic images including at least the first target region and the second target region from the three-dimensional medical image, based on the first classification result,
wherein the determination unit determines the image region to be subjected to the classification, based on the at least one tomographic image identified by the identification unit.

3. The image processing apparatus according to claim 1, wherein the first and the second classifiers are classifiers that have been trained based on deep learning.

4. The image processing apparatus according to claim 1, wherein the first classifier of the first classification unit and the second classifier of the second classification unit output likelihood as classification results.

5. The image processing apparatus according to claim 1, wherein the first and the second target regions are regions adjacent to each other.

6. The image processing apparatus according to claim 1, wherein the first classifier of the first classification unit is a classifier trained based on the machine-learning to classify a plurality of classes including at least the class representing the first target region and the class representing the second target region.

7. The image processing apparatus according to claim 2, wherein the acquisition unit further acquires prior information about a relative position between the first and the second target regions, and
wherein the identification unit identifies the tomographic image including the first and the second target regions, based on the first classification result and the prior information about the relative position.

8. The image processing apparatus according to claim 1, wherein the first classifier of the first classification unit includes a classifier trained using a first training dataset based on a three-dimensional medical image for use in training, and
wherein the second classifier of the second classification unit includes a classifier trained using a second training dataset based on the three-dimensional medical image for use in training.

9. The image processing apparatus according to claim 8, wherein the first and the second training datasets are training datasets targeting different training ranges in the three-dimensional medical image for use in training.

10. The image processing apparatus according to claim 1, wherein the second classification unit includes a plurality of classifiers.

11. The image processing apparatus according to claim 10, wherein the plurality of classifiers of the second classification unit includes at least a classifier trained based on the machine-learning to classify a plurality of classes including the class representing the first target region and a classifier trained based on the machine-learning to classify a plurality of classes including the class representing the second target region.

12. The image processing apparatus according to claim 10, wherein the plurality of classifiers of the second classification unit includes classifiers trained using training datasets targeting different training ranges in the three-dimensional medical image for use in training.

13. The image processing apparatus according to claim 9, wherein the training range of the second training dataset is a training range targeting a range narrower than the training range of the first training dataset.

14. The image processing apparatus according to claim 4, wherein the integration unit performs integration processing based on the likelihood.

15. The image processing apparatus according to claim 9, wherein the integration unit performs integration processing according to the training ranges of the classifiers.

16. The image processing apparatus according to claim 1, wherein the integration unit acquires the third classification result by integration using the second classification result for pixels included in an image region subjected to the classification in the three-dimensional medical image and using the first classification result for regions not included in the image region subjected to the classification in the three-dimensional medical image.

17. The image processing apparatus according to claim 1, wherein the integration unit acquires the third classification result by integrating the first and the second classification results based on either one of integration methods including weighted average value integration, maximum value integration, the logical sum integration, and logical product integration for pixels included in an image region subjected to the classification in the three-dimensional medical image.

18. The image processing apparatus according to claim 2, wherein the determination unit determines a bounding box enclosing at least the first and the second target regions for the tomographic image identified by the identification unit, and determines an image region to be subjected to the classification based on the determined bounding box.

19. An image processing method comprising:
acquiring a three-dimensional medical image;
classifying, as first classifying, each of a plurality of pixels included in the three-dimensional medical image into a plurality of classes to acquire a first classification result, the classifying being performed using a first classifier trained based on machine-learning to classify the plurality of classes including a class representing a first target region;
determining an image region including at least the first target region and a second target region from the three-dimensional medical image as an image region to be subjected to the classification, based on the first classification result;
classifying, as second classifying, each of a plurality of pixels included in the image region determined by the determining into a plurality of classes to acquire a second classification result, the classifying being performed using a second classifier trained based on machine-learning to classify each pixel into the plurality of classes including at least either one of a class representing the first target region and a class representing the second target region; and
integrating the first and the second classification results to acquire a third classification result.

20. A non-transitory storage medium storing a program for causing a computer to execute a method comprising:
acquiring a three-dimensional medical image;
classifying, as first classifying, each of a plurality of pixels included in the three-dimensional medical image into a plurality of classes to acquire a first classification result, the classifying being performed using a first classifier trained based on machine-learning to classify the plurality of classes including a class representing a first target region;
determining an image region including at least the first target region and a second target region from the three-dimensional medical image as an image region to be subjected to the classification, based on the first classification result;

classifying, as second classifying, each of a plurality of pixels included in the image region determined by the determining into a plurality of classes to acquire a second classification result, the classifying being performed using a second classifier trained based on machine-learning to classify each pixel into the plurality of classes including at least either one of a class representing the first target region and a class representing the second target region; and integrating the first classification result and the second classification result to acquire a third classification result.

21. The image processing apparatus according to claim 1, wherein the acquisition unit further acquires prior information about a relative position between the first target region and the second target region, and wherein the determination unit determines the image region, based on the first classification result and the prior information about the relative position.

* * * * *